(12) United States Patent
Chae et al.

(10) Patent No.: US 11,018,919 B2
(45) Date of Patent: *May 25, 2021

(54) SYNCHRONIZATION SIGNAL TRANSMISSION METHOD AND APPARATUS FOR DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Suhwan Lim, Seoul (KR); Hanbyul Seo, Seoul (KR); Hakseong Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,118

(22) Filed: Oct. 21, 2019

(65) Prior Publication Data

US 2020/0052951 A1 Feb. 13, 2020

Related U.S. Application Data

(63) Continuation of application No. 15/505,554, filed as application No. PCT/KR2015/009254 on Sep. 2, 2015, now Pat. No. 10,454,743.

(Continued)

(51) Int. Cl.
*H04L 27/26* (2006.01)
*H04J 11/00* (2006.01)
(Continued)

(52) U.S. Cl.
CPC .......... *H04L 27/2662* (2013.01); *H04J 11/00* (2013.01); *H04W 52/54* (2013.01); *H04W 76/14* (2018.02); *H04W 4/70* (2018.02)

(58) Field of Classification Search
CPC ....... H04W 76/14; H04W 4/70; H04W 92/18; H04W 56/002; H04W 88/04;
(Continued)

(56) References Cited

U.S. PATENT DOCUMENTS 7,058,113 B2   6/2006   Etoh
8,369,280 B2   2/2013   Dinan
(Continued)

FOREIGN PATENT DOCUMENTS

CN   102217411   10/2011
CN   102884740    1/2013
(Continued)

OTHER PUBLICATIONS

U.S. Appl. No. 13/014,665, Office Action dated Nov. 29, 2012, 24 pages.
(Continued)

*Primary Examiner* — Yemane Mesfin
*Assistant Examiner* — Mon Cheri S Davenport
(74) *Attorney, Agent, or Firm* — Lee Hong Degerman Kang & Waimey

(57) ABSTRACT

A terminal apparatus for a device-to-device (D2D) terminal in a wireless communication system, according to an embodiment of the present invention, comprises a transmission device and a reception device; and a processor, wherein the processor generates and transmits a primary sidelink synchronization signal (PSSS) and a secondary sidelink synchronization signal (SSSS), wherein, if a PSBCH is transmitted in a subframe in which the PSSS and the SSSS are being transmitted and is normal CP, the PSSS and a PSBCH on power is the average power of a period, in the subframe in which the PSSS and the SSSS are being transmitted, not including a transient period, wherein the transient period of a starting part of the period for the PSSS (Continued)

(a)

(b)

and PSBCH ON power is not overlapped with an OFDM symbol on which the PSSS is transmitted.

14 Claims, 16 Drawing Sheets

Related U.S. Application Data

(60) Provisional application No. 62/044,977, filed on Sep. 2, 2014, provisional application No. 62/054,974, filed on Sep. 24, 2014, provisional application No. 62/085,347, filed on Nov. 28, 2014, provisional application No. 62/109,045, filed on Jan. 28, 2015, provisional application No. 62/110,614, filed on Feb. 2, 2015.

(51) Int. Cl.
*H04W 76/14* (2018.01)
*H04W 52/54* (2009.01)
*H04W 4/70* (2018.01)

(58) Field of Classification Search
CPC . H04W 24/08; H04W 56/0015; H04W 52/54; H04W 56/00; H04W 72/02; H04W 56/001; H04W 56/0025; H04W 72/0453; H04W 52/367; H04W 72/0446; H04W 88/02; H04W 52/322; H04W 52/383; H04W 72/121; H04W 48/10; H04L 27/2662; H04L 27/2655; H04J 11/00
See application file for complete search history.

(56) References Cited

U.S. PATENT DOCUMENTS

| | | | |
|---|---|---|---|
| 8,427,976 B1 | 4/2013 | Dinan | |
| 8,526,347 B2 | 9/2013 | Wang et al. | |
| 8,576,794 B1 | 11/2013 | Dinan | |
| 8,644,865 B2 | 2/2014 | Chung et al. | |
| 8,665,809 B2 | 3/2014 | Malladi et al. | |
| 8,730,861 B2 | 5/2014 | Montojo et al. | |
| 8,750,257 B2 | 6/2014 | Chung et al. | |
| 8,811,319 B2 | 8/2014 | Shen | |
| 8,842,610 B2 | 9/2014 | Lee et al. | |
| 8,937,918 B2 | 1/2015 | Dinan | |
| 8,948,109 B2 | 2/2015 | Lee et al. | |
| 8,965,294 B2 | 2/2015 | Seo et al. | |
| 8,982,750 B2 | 3/2015 | Palanki et al. | |
| 9,077,472 B2 | 7/2015 | Sumasu et al. | |
| 9,078,109 B2 | 7/2015 | He et al. | |
| 9,084,283 B2 | 7/2015 | Palanki et al. | |
| 9,143,364 B2 | 9/2015 | Mohammed et al. | |
| 9,215,647 B2 | 12/2015 | Vannithamby et al. | |
| 9,237,522 B2 | 1/2016 | Golitschek Edler Von Elbwart et al. | |
| 9,272,851 B2 | 3/2016 | Hwang et al. | |
| 9,332,516 B2 | 5/2016 | Blankenship et al. | |
| 9,386,535 B2 | 7/2016 | Park et al. | |
| 9,408,085 B2 | 8/2016 | Abe et al. | |
| 9,479,321 B2 | 10/2016 | Koorapaty et al. | |
| 9,515,759 B2 | 12/2016 | Kim et al. | |
| 9,591,597 B2 | 3/2017 | Son et al. | |
| 9,635,679 B2 | 4/2017 | Choi et al. | |
| 9,699,046 B2 | 7/2017 | Chung et al. | |
| 9,699,749 B2 | 7/2017 | Chae et al. | |
| 9,713,123 B2 | 7/2017 | Yoshimoto et al. | |
| 9,749,976 B2 | 8/2017 | Awad et al. | |
| 9,750,044 B2 | 8/2017 | Ku et al. | |
| 9,769,811 B2 | 9/2017 | Lee et al. | |
| 9,807,711 B2 | 10/2017 | Zhao et al. | |
| 9,955,442 B2 | 4/2018 | Gaal et al. | |
| 10,454,743 B2 * | 10/2019 | Chae | H04J 11/00 |
| 2013/0315152 A1 | 11/2013 | Ratasuk et al. | |
| 2014/0064263 A1 | 3/2014 | Cheng et al. | |
| 2014/0112194 A1 | 4/2014 | Novlan et al. | |
| 2014/0169361 A1 | 6/2014 | Kim et al. | |
| 2014/0219270 A1 | 8/2014 | Ro et al. | |
| 2014/0321314 A1 | 10/2014 | Fodor et al. | |
| 2015/0092768 A1 | 4/2015 | Ng et al. | |
| 2017/0142741 A1 * | 5/2017 | Kaur | H04W 72/02 |
| 2017/0150480 A1 * | 5/2017 | Kim | H04W 8/005 |
| 2017/0272299 A1 | 9/2017 | Chae et al. | |

FOREIGN PATENT DOCUMENTS

| | | |
|---|---|---|
| CN | 103532665 | 1/2014 |
| RU | 2515547 | 5/2014 |
| WO | 2014070066 | 5/2014 |
| WO | 2014098522 | 6/2014 |
| WO | 2014116020 | 7/2014 |

OTHER PUBLICATIONS

Russian Federation Federal Service for Intellectual Property, Patents and Trademarks Application Serial No. 2017106222/07, Notice of Allowance dated Jan. 18, 2018, 19 pages.
Chinese application No. 201580046892.1, Office Action dated Jun. 3, 2019, 17 pages.
U.S. Appl. No. 15/505,554, Office Action dated Nov. 8, 2018, 28 pages.
U.S. Appl. No. 15/505,908, Notice of Allowance dated Mar. 25, 2020, 10 pages.
European Patent Office Application Serial No. 15838380.2, Search Report dated Apr. 4, 2018, 6 pages.
Qualcomm, et al., "D2D Tx Requirements: Output power dynamics", 3GPP TSG RAN WG4 Meeting #74, R4-150191, XP050955369, Feb. 2015, 12 pages.
PCT International Application No. PCT/KR2015/009254, Written Opinion of the International Searching Authority dated Dec. 15, 2015, 17 pages.
PCT International Application No. PCT/KR2015/009255, Written Opinion of the International Searching Authority dated Dec. 23, 2015, 17 pages.
U.S. Appl. No. 15/505,908, Final Office Action dated Mar. 8, 2019, 7 pages.
United States Patent and Trademark Office U.S. Appl. No. 16/548,745, Office Action dated Nov. 2, 2020, 46 pages.

\* cited by examiner

SYNCHRONIZATION SIGNAL TRANSMISSION METHOD AND APPARATUS FOR DEVICE-TO-DEVICE TERMINAL IN WIRELESS COMMUNICATION SYSTEM

CROSS-REFERENCE TO RELATED APPLICATIONS

This application is a continuation of U.S. patent application Ser. No. 15/505,554, filed on Feb. 21, 2017, now U.S. Pat. No. 10,454,743, which is the National Stage filing under 35 U.S.C. 371 of International Application No. PCT/KR2015/009254, filed on Sep. 2, 2015, which claims the benefit of U.S. Provisional Application No. 62/044,977, filed on Sep. 2, 2014, 62/054,974, filed on Sep. 24, 2014, 62/085,347, filed on Nov. 28, 2014, 62/109,045, filed on Jan. 28, 2015 and 62/110,614, filed on Feb. 2, 2015, the contents of which are all hereby incorporated by reference herein in their entirety.

TECHNICAL FIELD

The present invention relates to a wireless communication system, and more particularly, to a method and apparatus for transmitting a synchronization signal in device-to-device communication.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will simplify procedures of an evolved Node B (eNB), reduce the power consumption of devices participating in D2D communication, increase data transmission rates, increase the accommodation capability of a network, distribute load, and extend cell coverage.

DISCLOSURE

Technical Problem

An object of the present invention is to provide a mask for minimizing an influence of interference between WAN and D2D signals and a method for transmitting a synchronization signal.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a device-to-device (D2D) UE in a wireless communication system comprises a transmission module and a reception module; and a processor, wherein the processor generates and transmits a primary sidelink synchronization signal (PSSS) and a secondary sidelink synchronization signal (SSSS), and wherein, if a PSBCH is transmitted at a subframe on which the PSSS and the SSSS are transmitted and in case of normal CP, the PSSS and PSBCH ON power is an average power of a period over the subframe on which the PSSS and the SSSS are transmitted excluding transient periods, and a transient period of the starting part of the period for the PSSS and PSBCH ON power is not overlapped with an OFDM symbol on which the PSSS is transmitted.

In one embodiment of the present invention, a method for transmitting a synchronization signal from a D2D UE in a wireless communication system comprises the steps of generating a primary sidelink synchronization signal (PSSS) and a secondary sidelink synchronization signal (SSSS); and transmitting the PSSS and the SSSS, wherein, if a PSBCH is transmitted at a subframe on which the PSSS and the SSSS are transmitted and in case of normal CP, the PSSS and PSBCH ON power is an average power of a period over the subframe on which the PSSS and the SSSS are transmitted excluding transient periods, and a transient period of the starting part of the period for the PSSS and PSBCH ON power is not overlapped with an OFDM symbol on which the PSSS is transmitted.

The transient period of the starting part of the period for the PSSS and PSBCH ON power may be located at a previous symbol of the OFDM symbol to which the PSSS is transmitted.

The transient period of the starting part of the period for the PSSS and PSBCH ON power may start from a start point of the previous symbol of the OFDM symbol to which the PSSS is transmitted.

The transient period of the starting part of the period for the PSSS and PSBCH ON power may have a length of 20 us.

The transient period of the end part of the period for the PSSS and PSBCH ON power may be overlapped with an OFDM symbol to which the SSSS is transmitted.

The transient period of the end part of the period for the PSSS and PSBCH ON power may have a length of 40 us.

A transient period of the end part of a period for ON power of the SSSS may be located at next OFDM symbol of a second OFDM symbol to which the SSSS is transmitted, and may have a length of 20 us.

If the PSBCH is transmitted at the subframe on which the PSSS and the SSSS are transmitted and in case of extended CP, the PSSS and PSBCH ON power is an average power of a period over the subframe on which the PSSS and the SSSS are transmitted excluding transient periods, and the transient period of the starting part of the period for the PSSS and PSBCH ON power may be overlapped with the OFDM symbol to which the PSSS is transmitted.

The transient period of the starting part of the period for the PSSS and PSBCH ON power may be located at the OFDM symbol to which the PSSS is transmitted.

If the PSBCH is not transmitted at the subframe on which the PSSS and the SSSS are transmitted and in case of normal CP, the transient period of the starting part of the period for the PSSS ON power may not be overlapped with the OFDM symbol to which the PSSS is transmitted.

If the PSBCH is not transmitted at the subframe on which the PSSS and the SSSS are transmitted and in case of extended CP, the transient period of the starting part of the period for the PSSS ON power may be overlapped with the OFDM symbol to which the PSSS is transmitted.

If the PSBCH is not transmitted at the subframe on which the PSSS and the SSSS are transmitted, the transient period of the starting part of the period for ON power of the SSSS may not be overlapped with the OFDM symbol to which the SSSS is transmitted, regardless of CP length.

Advantageous Effects

According to the embodiment of the present invention, an influence of interference on WAN signal transmission may be minimized and at the same time a synchronization signal may be transmitted.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
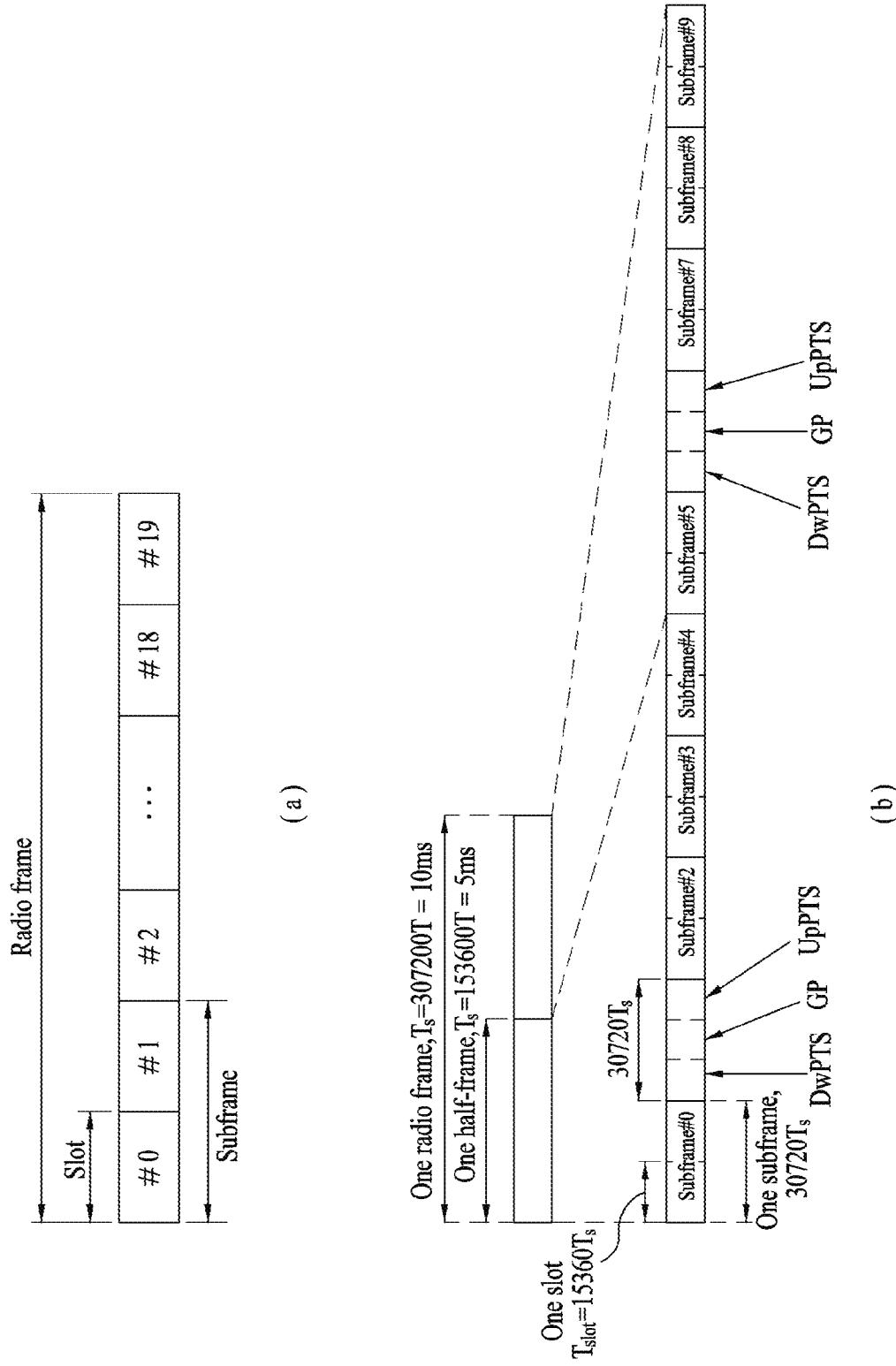
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
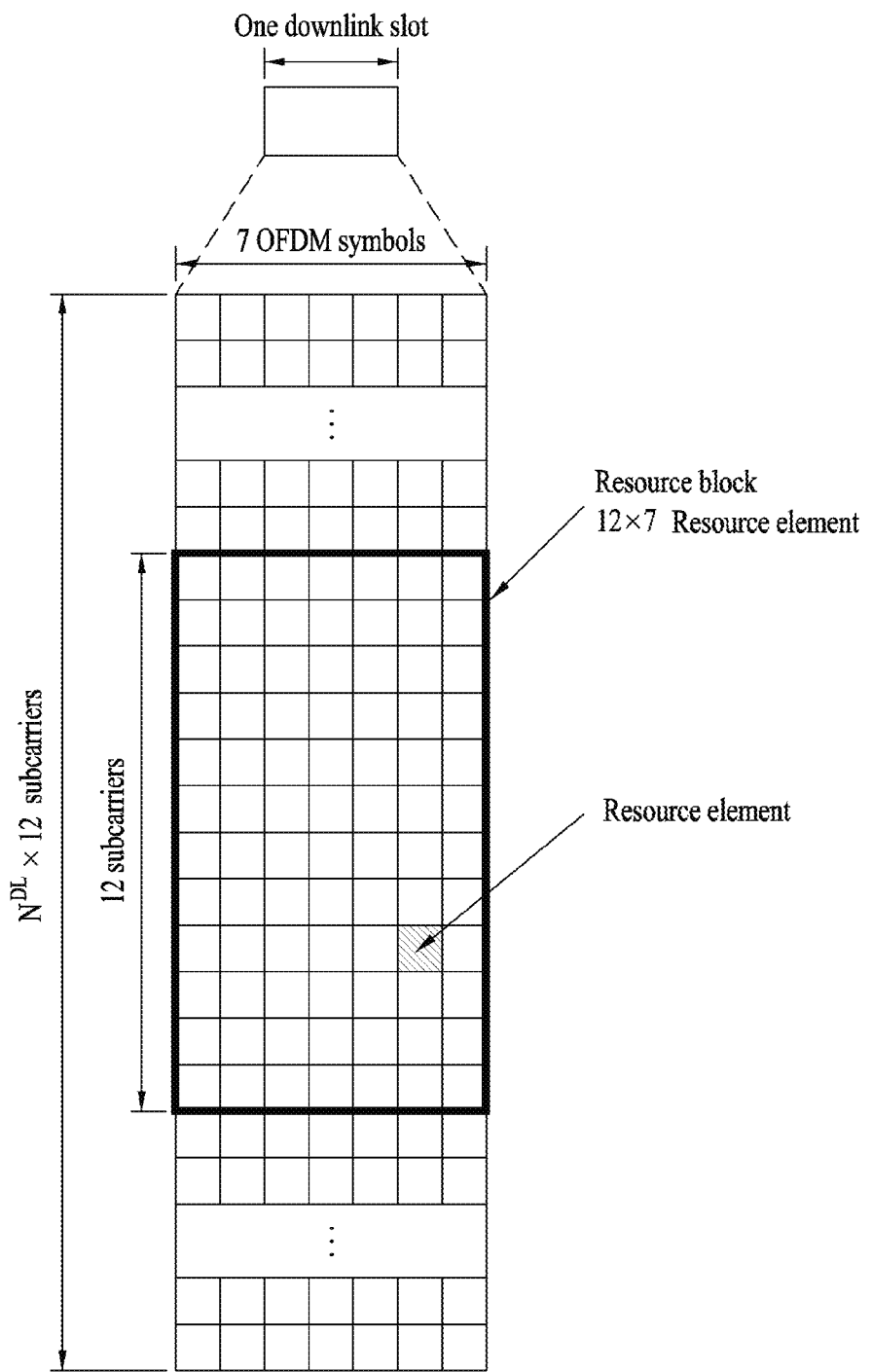
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
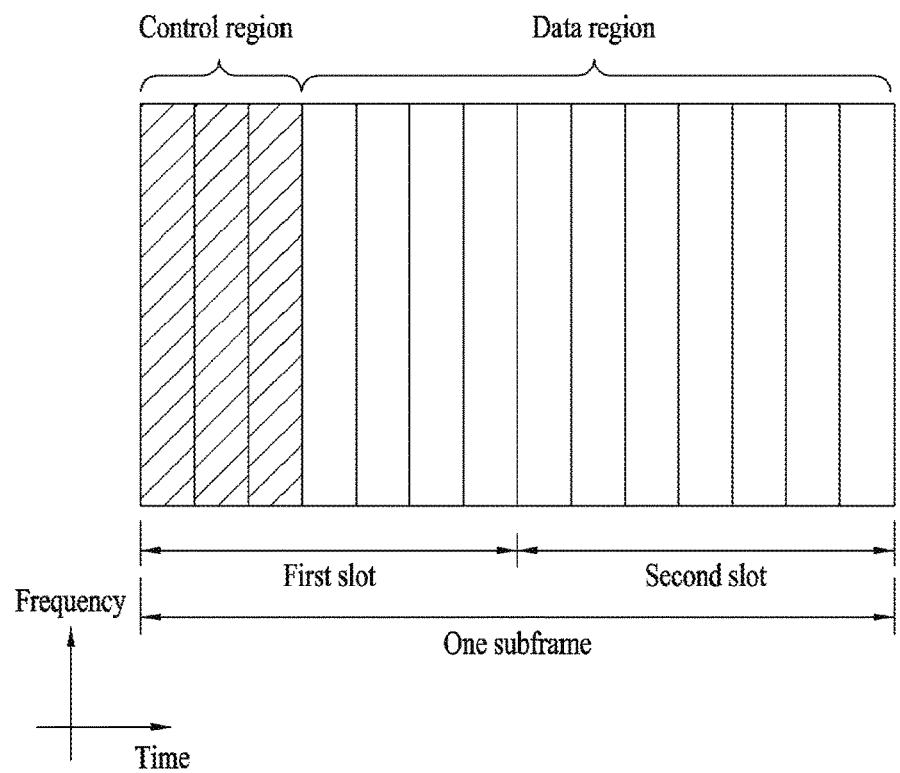
FIG. 3 is a diagram showing the structure of a downlink subframe.

FIG. 3 illustrates the structure of a downlink subframe. Up to three OFDM symbols at the starting part of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI).

To indicate that the PDCCH carries a Random Access Response in response to a Random Access Preamble transmitted by a UE, its CRC may be masked by a Random Access-RNTI (RA-RNTI).

Figure 4:
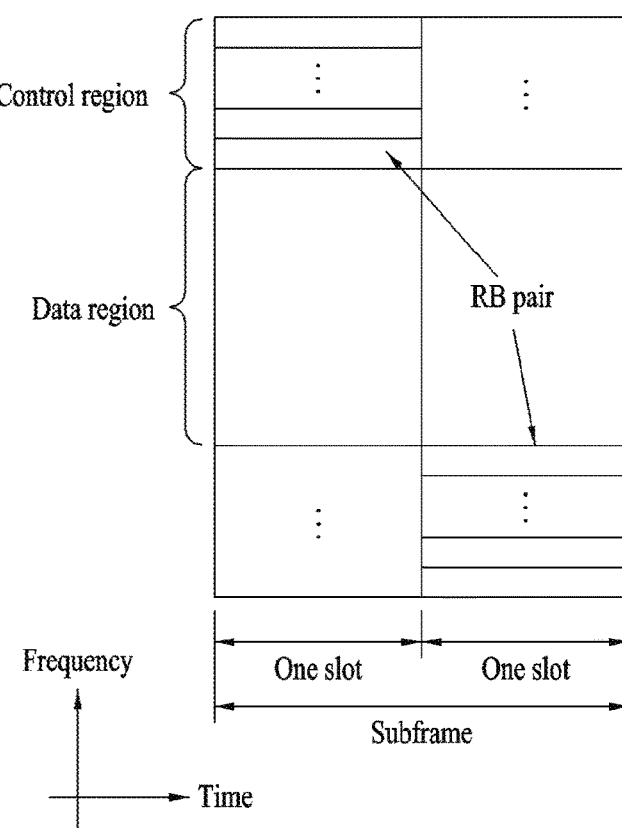
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Uplink Power Control

In an LTE/LTE-A system, uplink power control is applied for demodulation of uplink control information and data and can be divided into PUCCH power control, PUSCH power control and uplink sounding reference signal (SRS) power control.

PUCCH power control is determined in consideration of pathloss and a maximum transmission power of UEs such that control information transmitted on a PUCCH is demodulated at a sufficiently low error rate.

Specifically, PUCCH power control can be performed at subframe i of a cell c as expressed by the following Equation 1.

Equation 1

$$P_{PUCCH}(i) = \min\left\{ \begin{array}{c} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm]$$ [Equation 1]

In this case, $P_{CMAX,c}(i)$ denotes a maximum transmission power of a UE and corresponds to the upper limit of a PUCCH power control command.

$P_{0\_PUCCH}$ denotes a PUCCH transmission power value that an eNB wants to receive. This value is transmitted as a UE-specific parameter through higher layer signaling and determined by the sum of a nominal power value $P_{O\_NOMINAL\_PUCCH}$ and $P_{O\_UE\_PUCCH}$.

$PL_C$ is a pathloss value in cell c and is estimated by a UE. This value can be estimated by the UE by measuring a received power of a downlink cell-specific reference signal (CRS).

$h(n_{CQI}, n_{HARQ}, n_{SR})$ is a value dependent on a PUCCH format, wherein $n_{CQI}$ denotes the number of bits indicating channel quality information, $n_{HARQ}$ denotes the number of HARQ bits, and $n_{SR}$ is 1 when subframe i is configured for scheduling request and 0 otherwise. $h(n_{CQI}, n_{HARQ}, n_{SR})$ is dependent on PUCCH format. Specifically, $h(n_{CQI}, n_{HARQ}, n_{SR})$ may be i) 0 in the case of PUCCH formats 1, 1a and 1b, ii)

$$\frac{(n_{HARQ} - 1)}{2}$$

when one or more serving cells are used in PUCCH format 1b and iii)

$$10\log_{10}\left(\frac{n_{CQI}}{4}\right)$$

when normal cyclic prefix is used in PUCCH formats 2, 2a and 2b.

$\Delta_{F\_PUCCH}(F)$ is a value signaled from a higher layer in consideration of MCS. This value indicates that different signal-to-noise-plus-interference ratios (SINR) are necessary according to the number of bits per subframe and different error rates depending on PUCCH formats.

$\Delta_{TxD}(F')$ is a power offset signaled by a higher layer when a PUCCH is transmitted using two antenna ports and is dependent on PUCCH format.

g(i) is a current PUCCH power control state accumulation value and is determined by a power value $\delta_{PUCCH}$ corresponding to a transmission power control command field value included in a DCI format transmitted on a PDCCH, and a PUCCH power control state value g(i−1) of the previous subframe.

PUSCH power control when PUCCH transmission is not performed can be determined as expressed by the following Equation 2.

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm]$$ [Equation 2]

$P_{CMAX,c}(i)$ denotes a maximum transmission power of a UE and $M_{PUSCH,c}(i)$ denotes a PUSCH transmission bandwidth represented by the number of RBs.

$P_{O\_PUSCH,c}(j)$ denotes a PUSCH transmission power value that an eNB wants to receive. This value is determined by the sum of a nominal power value $P_{O\_NOMINAL\_PUCCH}$ and $P_{O\_UE\_PUCCH}$. This value is determined as j=0 in the case of semi-persistent scheduling, j=1 in the case of dynamic scheduling and j=2 in the case of random access response.

$\alpha_c(j) \cdot PL_c$ denotes downlink pathloss. In this case, $PL_c$ is a value estimated by the UE, and $\alpha_c(j)$ is a pathloss compensation value transmitted through higher layer signaling. $\alpha_c \in \{0, 0.4, 0.5, 0.6, 0.7, 0.8, 0.9, 1\}$ when j is 0 or 1 and $\alpha_c(j)=1$ when j is 1.

$\Delta_{TF,c}(i)$ is a value calculated using a value transmitted through higher layer signaling, bit per resource element (BPRE) and the numbers of bits of a CQI and a PMI.

$f_c(i)$ is an accumulation value and is determined by a power value $\delta_{PUSCH}$ corresponding to a transmission power control (TPC) command field value included in a DCI format transmitted on a PDCCH, $K_{PUSCH}$ according to FDD and TDD and an accumulation value $f_c(i-1)$ up to the previous subframe.

When PUSCH transmission is performed along with PUCCH transmission, PUSCH power control is expressed by the following Equation 3.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [\text{dBm}] \quad [\text{Equation 3}]$$

$\hat{P}_{CMAX,c}(i)$ is a linear value for $P_{CMAX,c}(i)$ and $\hat{P}_{PUCCH}(i)$ is a linear value for PUCCH power control determined by the above Equation 3. Other parameters have been described above.

Synchronization Acquisition of D2D UE

Hereinafter, description will be given of acquisition of synchronization between UEs in D2D communication based on the above description and the legacy LTE/LTE-A system. In the OFDM system, if time/frequency synchronization is not matched, OFDM signals may not be multiplexed between different UEs due to inter-cell interference. Moreover, it is not efficient that all D2D UEs individually match synchronization by directly transmitting and receiving synchronization signals. Accordingly, in a distributed node system such as the D2D system, a specific node may transmit a representative synchronization signal and the other UEs may match synchronization with reference to the representative synchronization signal. In other words, a scheme may be used in which some nodes (e.g., eNB, UE or synchronization reference node (SRN) or synchronization source) transmit D2D synchronization signals (D2DSSs) and the other UEs transceive signals by matching synchronization with reference to the D2D synchronization signals.

The D2DSS may include a PD2DSS (primary D2DSS) and an SD2DSS (secondary D2DSS). The PD2DSS may have a form of a predetermined length of Zadoff-chu sequence or have a structure similar to/modified from/obtained by repeating that of the PSS. The SD2DSS may have a form of M-sequence or have a structure similar to/modified from/obtained by repeating that of the SSS. If UEs match synchronization with each other with reference to the eNB, the SRN may be the eNB, and the D2DSS may be the PSS/SSS. A physical D2D synchronization channel (PD2DSCH) may mean a (broadcast) channel for carrying basic (system) information (e.g., D2DSS related information, duplex mode (DM), TDD UL/DL configuration, information on a resource pool, a type of an application associated with D2DSS, etc.) which a UE needs to know before transmitting and receiving a D2D signal. That is, the PD2DSCH is a channel for transmitting system related information and synchronization related information, and may be referred to as 'PSBCH (Physical Sidelink Broadcast Channel)'. The PSBCH may be transmitted on the same subframe as the D2DSS or a subsequent frame.

The SRN may be a node for transmitting D2DSS and PSBCH. The D2DSS may be a type of a specific sequence, and the PSBCH may have the form of a sequence representing specific information or the form of a codeword obtained through predetermined channel coding. In this case, the SRN may be the eNB or the specific D2D UE. In the case of 'partial network coverage' or 'out of network coverage', the UE may be the SRN. Even in case of intercell discovery, the UE may relay the D2DSS at the point of time when a certain offset is added to the point of timing when the UEs receive the D2DSS from the SRN in order for the neighboring UEs to recognize the timing. That is, the D2DSS may be relayed through a multi-hop. If the UEs which have relayed the D2DSS are plural or there are a plurality of clusters around, the UE which receives the D2DSS may observe a plurality of D2DSSs, and may receive D2DSSs having different hops.

Transmission of Discovery Signal and PUCCH Transmission

Discovery signal transmission for discovery between UEs in D2D communication may be classified into two types as follows. Type 1 is discovery signal transmission when discovery signal transmission resource allocation is not UE-specific, and Type 2 is discovery signal transmission when discovery signal transmission resource allocation is UE-specific. In case of Type 1, only a resource region to which a discovery signal is transmitted is configured by a network, and a UE may transmit the discovery signal by determining a resource in the resource region (based on random or energy sensing). (D2D communication may also be classified into two methods in accordance with a scheduling mode. The D2D communication may be classified into mode 1 in which a transmission resource is scheduled by an eNB and mode 2 in which a transmission resource is determined by a UE. In case of the mode 1, the eNB indicates a transmission resource through DCI, and the mode 2 means that the eNB configures a brief transmission region only (or transmission resource region is previously configured) and the UE selects a specific resource and transmits the selected resource. In this case, the resource region to which the discovery signal is transmitted may not be overlapped with a PUCCH resource region. In more detail, since the PUCCH resource is a resource to which legacy UEs transmit ACK/NACK or CSI, the PUCCH resource may be excluded from the discovery signal transmission resource region. Also, power control may be applied to PUCCH transmission. Therefore, PUCCH transmission may be affected by serious interference by inband emission during discovery signal transmission. In this respect, hereinafter, methods for protecting both discovery signal transmission and PUCCH transmission will be described. Although the following description is based on a relation between discovery signal and PUCCH transmission, an application range of the present invention is not limited to the following description, and the present invention may be applied to even a relation between another type D2D signal and WAN signal in addition to the discovery signal.

Open Loop Power Control (OLPC)

PUCCH transmission may be protected through transmission power control during discovery signal transmission. In this case, as transmission power control, open loop power control may be appropriate in view of property of discovery signal transmission (closed loop power control may be applied in accordance with a D2D signal type). That is, when a UE transmits a discovery signal, a transmission power may depend on the following Equation 4.

Equation 4

$$P_{D2D-Discovery}(i) = \min \begin{cases} P_{CMAX}(i), \\ P_{0\_D2D\_Discovery} + \alpha \cdot PL + \Delta_{D2D\_Discovery} \end{cases} \quad [\text{Equation 4}]$$

In the Equation, $P_{0\_D2D\_Discovery}$ is a minimum transmission power value, PL is pathloss, $\Delta_{D2D\_Discovery}$ is a power boosting parameter (power offset, power backoff parameter), $\alpha$ is a pathloss coefficient ($0 = < \alpha = < 1$, 1 in case of PUCCH). In this case, $P_{0\_D2D\_Discovery}$, $\alpha$ and $\Delta_{D2D\_Discovery}$ may previously be signaled to a UE or may be a previously set value. That is, $P_{0\_D2D\_Discovery}$, $\alpha$ may be signaled to the UE through higher layer signaling (for example, RRC signaling), broadcast or physical layer signaling (system information block, PDCCH or EPDCCH). The parameters related to power control may be signaled in the same manner as the above example. The backoff parameter $\Delta_{D2D\_Discovery}$ is offset introduced to allow a D2D signal to be transmitted at a lower (or higher) power if $P_{0\_D2D\_Discovery}$ reuses a value of another cellular channel. As the D2D maximum transmission power $P_{CMAX}$, a separate value in addition to the legacy $P_{CMAX}$ may be set.

Some of the above parameters, which are not signaled, may previously be set to specific values, or signaled values may be reused for cellular use, or if there is a separate signaling for D2D in a state that the signaled values are reused for cellular use, the signaled value may be used. For example, $P_{0\_D2D\_Discovery}$, α may not be signaled separately as the legacy PUSCH or PUCCH value is used, and $\Delta_{D2D\_Discovery}$ may be signaled for D2D.

Meanwhile, discovery signal transmission power may be controlled by step type transmission power control. For example, if signal strength RSRP, RSRQ from the eNB is a threshold value or less, which is previously set, the discovery signal may be transmitted at a previously configured transmission power XdBm, and if the signal strength is the threshold value or more, the discovery signal may be transmitted at YdBm. At this time, Y may be set to be smaller than X. This step type transmission power configuration is not limited to two steps, and may be generalized by configuration of M transmission power values. At this time, the threshold value for the signal strength from the eNB and the transmission power within the corresponding threshold range may be previously set values, or may be signaled from the eNB to the UE through a physical layer or higher layer signal.

Determination of Transmission Resource According to Signal Strength from eNB

Figure 5:
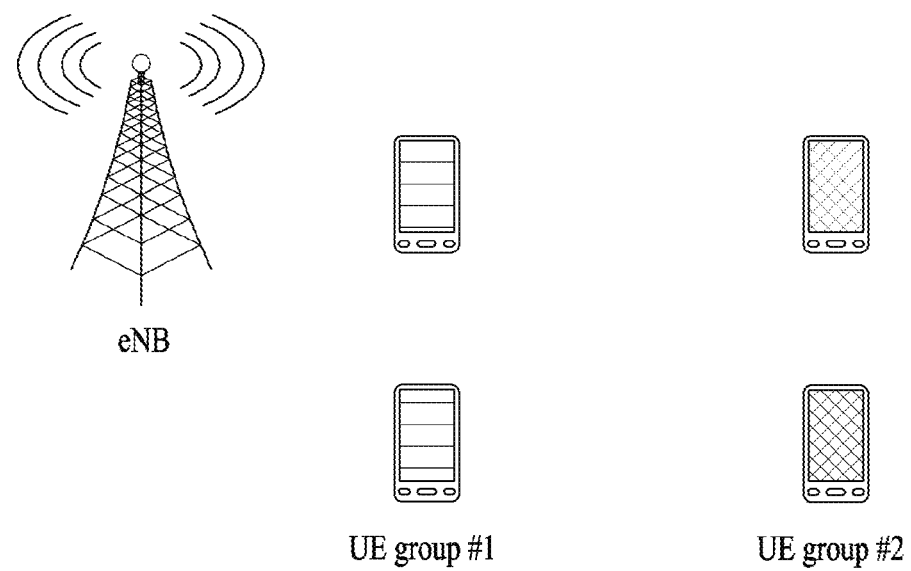
FIGS. 5 to 7 are diagrams showing resource selection for discovery signal transmission according to the embodiment of the present invention.
Figure 5:
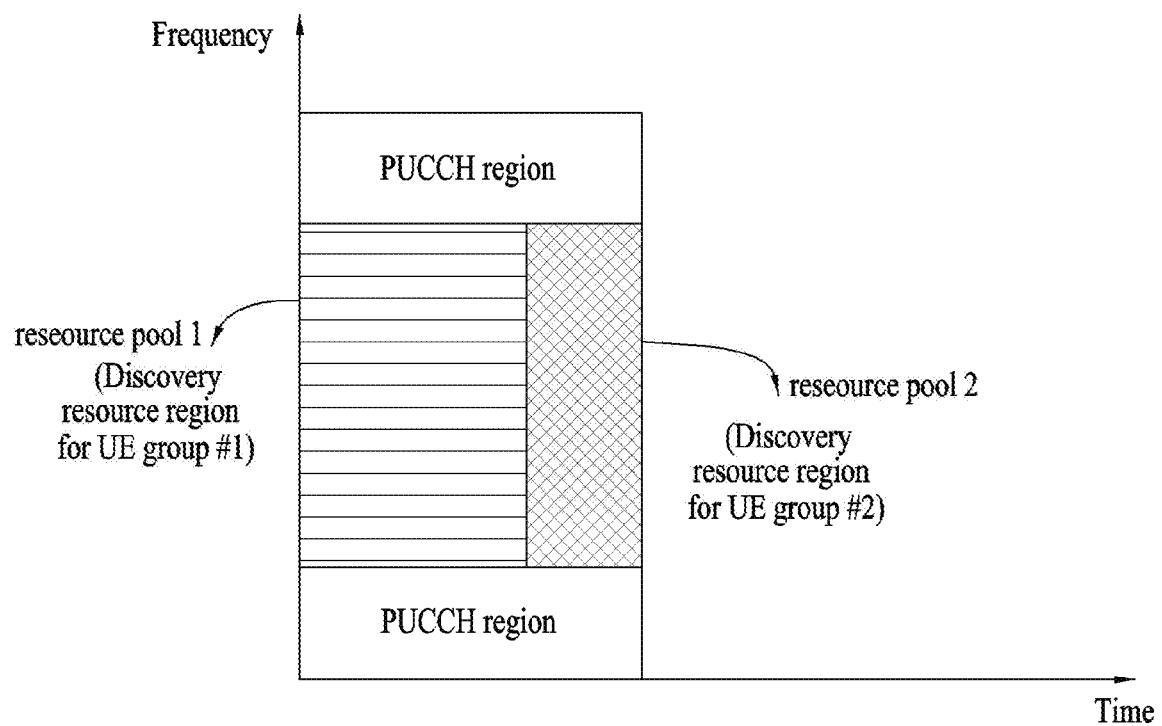
Figure 6:
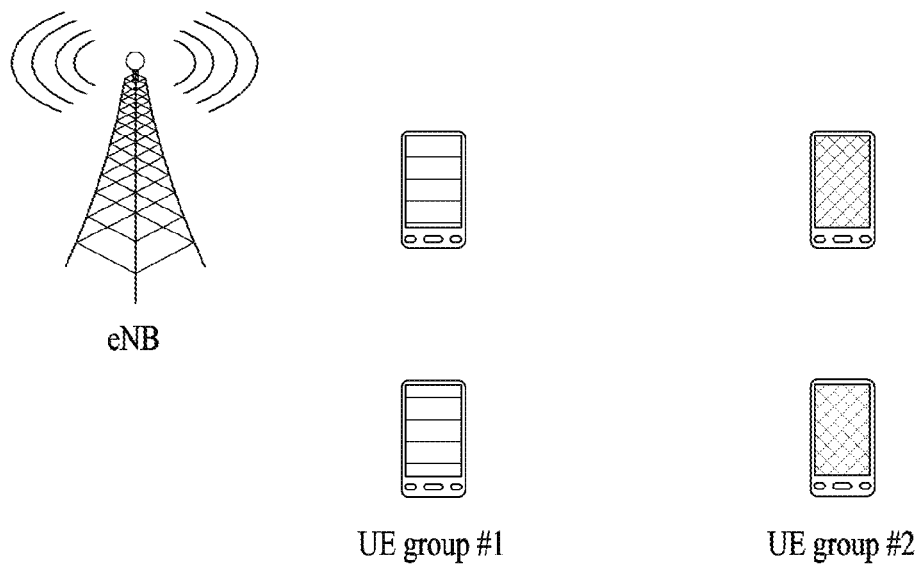
Figure 6:
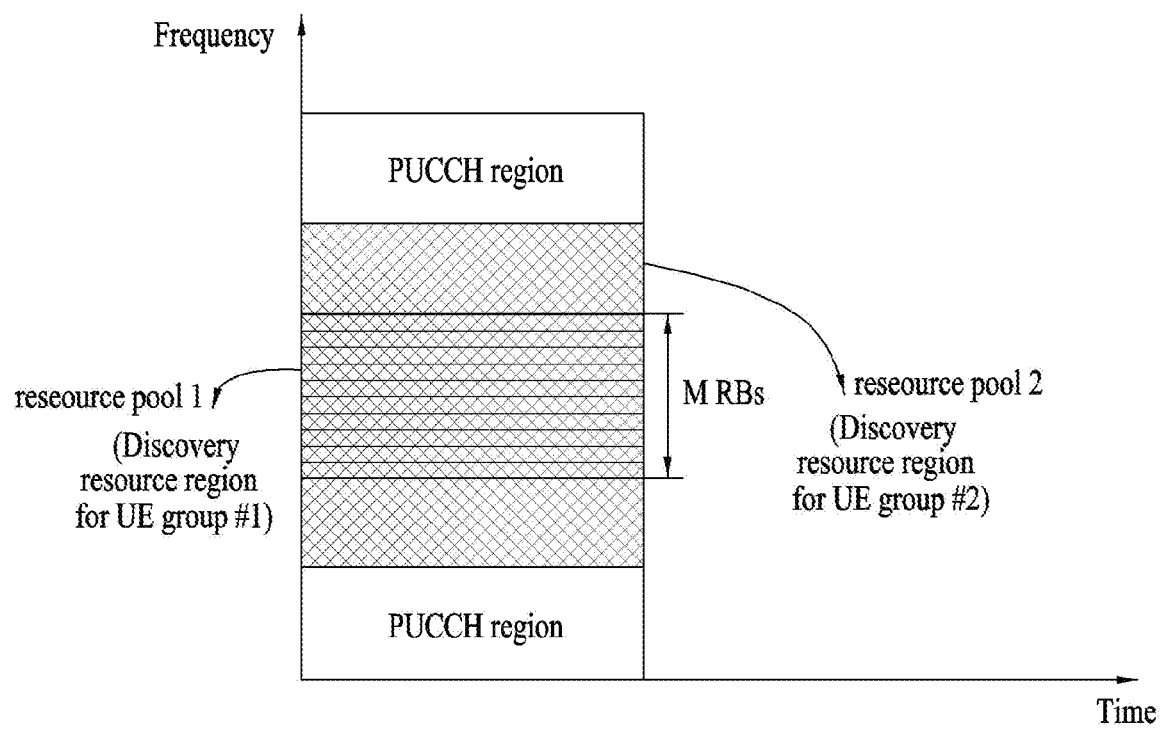

A transmission region of a discovery signal may be configured separately in accordance with signal strength (which may be RSRP or RSRQ, and may be a value related to received signal strength from an eNB in addition to RSRP or RSRQ). In more detail, one or more resource pools for discovery transmission may be configured, and an RSRP (or value related to received signal strength, such as RSRQ) range may be configured in each of one or more resource pools. In accordance with this configuration, a specific D2D UE may select a resource pool of a range in which RSRP is included, and may transmit a discovery signal by using a resource (which may be selected randomly from a resource pool) for discovery signal transmission in a resource pool. That is, a UE for which type 1 discovery is configured may select a resource pool from one or more resource pools, and may transmit a discovery signal by using a resource of the selected resource pool. At this time, the resource pool is selected in accordance with RSRP measurement result. This example is shown in FIGS. 5 and 6. Referring to FIG. 5, two resource pools are configured for the discovery signal. An RSRP range is configured in each of the two resource pools. For example, a resource pool 1 may be for the RSRP range of −110 to −80, and a resource pool 2 may be for the RSRP range of −80 to −60. UEs (for example, UEs which belong to UE group #1) having similar RSRPs due to similar distances from the eNB may transmit the discovery signal by using a resource of the same resource pool. Although the resource pool is configured in a TDM mode in FIG. 5, a plurality of resource pools may be configured in an FDM mode as shown in FIG. 6 or may be configured in a TDM+FDM mode (not shown).

The above configuration may simplify a design of a hopping pattern by allowing UEs having the same repetition factor (or the same unit size) to transmit a signal to a similar resource region. Also, the above configuration reduces performance attenuation caused by inband emission by allowing neighboring UEs or UEs having similar transmission powers to (simultaneously) transmit a signal at the same resource in consideration of inband emission. For example, in a state that two UEs are far away from each other, if a receiving UE is near a specific UE, a signal of a UE which is far away from the specific UE may not be received due to inband emission of the neighboring UEs. At this time, the neighboring UEs may be configured to simultaneously transmit a signal at the same resource, whereby performance attenuation may be reduced.

Identification of a resource pool according to RSRP may be enlarged to identify a transmission resource region in accordance with a size of a transmission power regardless of RSRP. For example, if UEs of a specific group may transmit a discovery signal at a high transmission power, the UEs of the specific group configure a time resource region differently from UEs of a low transmission power. The resource region (resource pool) for discovery signal transmission according to signal strength (or transmission power) of the eNB may be configured previously, or may be transferred by a network through physical layer signaling (SIB, PDCCH/EPDCCH, etc.) or higher layer signaling (RRC signaling). For example, the network may transfer a plurality of resource pools and a transmission power of each resource pool to the UE through physical layer signaling or higher layer signaling. The UE may select a resource pool in accordance with a target discovery range (target communication range in case of communication signal) and transmit the discovery signal at a transmission power configured in the selected resource pool.

Selection of the resource pool according to RSRP or transmission power as described above may be used together with the respective embodiments which will be described later. For example, the discovery signal may be transmitted at a transmission power of P_A dBm and N_A repetition times in a resource pool A, and may be transmitted at a transmission power of P_B dBm and N_B repetition times in a resource pool B. At this time, repetition times per resource pool may be signaled by the network through a physical layer or higher layer signal. The repetition times/unit size according to each resource region may be configured previously, or may be signaled to the UE by the network through the physical layer or higher layer signal. Through this configuration, multiplexing of the UEs having different repetition times/unit sizes may be performed actively and unnecessary blind decoding of the receiving UE may be avoided. If it is determined that the UE is out-of-coverage, this UE may transmit a D2D signal at a previously determined resource region at previously determined repetition times and a previously determined transmission power.

The transmission power and/or repetition times different per resource pool may be configured per step of a target range. For example, if a discovery range of three steps (short/medium/long) is configured, the resource region may be divided into three types and then transmission power and/or repetition times in each resource region may be configured differently to identify the range. Each UE selects a resource in accordance with a target range of application or service, and transmits the D2D signal at a transmission power/repetition times configured in the corresponding resource. In case of D2D communication, repetition times may be determined previously in each resource pool in accordance with the target range, or may be configured by a higher layer signal, and the D2D signal transmission UE may transmit a D2D communication packet by configuring repetition times and a transmission power in accordance with the target range. In order to simplify multiplexing between UEs having different repetition times, the transmission resource pool may be divided in accordance with repetition times. In the same manner as discovery communication, a transmission power and repetition times per D2D resource pool may be determined previously, or may be signaled by a higher layer signal. At this time, the repetition times may be maximum or minimum or average repetition times in the corresponding resource pool. In the same manner as D2D communication, in the SA pool, a transmission power and/or repetition times may be determined previously in accordance with the target range, or may be signaled to the UE through a physical layer or higher layer signal.

Determination of Repetition Times According to Signal Strength from eNB

Repetition times of a discovery signal may be determined in accordance with signal strength (RSRP, etc.) from an eNB. In this case, the repetition times may mean repetition times within one cycle of a discovery resource or maximum transmission times within a predetermined time. For example, if RSRP is within a certain threshold value or more, the repetition times of the discovery signal may be configured to M times, and if RSRP is the threshold value or less, the repetition times of the discovery signal may be configured to N times. In this case, since a lower transmission power of the discovery signal is configured if RSRP becomes great (that is, closer to eNB), M may be configured to be greater than N, whereby coverage loss due to the transmission power may be compensated by repeated transmission. According to more generalized description, the repetition times of the discovery signal may be configured previously in accordance with RSRP as illustrated in Table 1 below.

TABLE 1

| RSRP (R) | Repetition number of discovery signal |
|---|---|
| $R < P_1$ | $M_1$ |
| $P_1 < R < P_2$ | $M_2$ |
| ... | ... |
| $P_{T-1} < R < P_T$ | $M_T$ |

The repetition times according to signal strength (or transmission power) of the eNB may be configured previously, or may be transferred by a network through physical layer signaling (SIB, PDCCH/EPDCCH, etc.) or higher layer signaling (RRC signaling). In case of an out-of-coverage UE, the corresponding UE may be operated at a value set previously by a network operator. If the configuration such as Table 1 is signaled to the UE, a threshold value of each boundary and repetition times of each region may be included in the physical layer or higher layer signal.

In accordance with the aforementioned configuration, the problem (difference in discovery performance between cell edge UE and cell center UE) that may occur during open loop power control performed to protect PUCCH transmission may be solved.

Configuration of Discovery Unit According Signal Strength from eNB

The configuration operation of repetition times according to signal strength of the eNB may be implemented by configuration of one discovery signal unit at a greater size (or smaller size). That is, the size of the discovery unit is configured in accordance with signal strength from the eNB. For example, if signal strength of the eNB is P or more, (2RB×2SF) may be configured as one discovery signal unit, and if signal strength of the eNB is less than P, (2RB×1SF) may be configured as one discovery signal unit. The size of one discovery signal unit may be defined by the number of SFs in a time domain and the number of RBs in a frequency domain. The size of the discovery signal unit according to RSRP may be configured previously, or may be transferred by a network through physical layer signaling (SIB, PDCCH/EPDCCH, etc.) or higher layer signaling (RRC signaling). In case of an out-of-coverage UE, the corresponding UE may be operated at a value set previously by a network operator.

The repetition times (or unit size) in the resource pool may be determined by frequency (and/or time) resource size of the corresponding resource pool or a system bandwidth. For example, if the system bandwidth is a certain RB or more, the repetition times (or unit size) may be configured to A, and if the system bandwidth is a certain RB or less, the repetition times (or unit size) may be configured to B. This is to allow D2D signals of more UEs to be subjected to multiplexing by reducing the repetition times or to reduce interference caused by repetition because sufficient frequency (and/or time) diversity cannot be obtained in this method if the frequency resource size is small. On the contrary, if the resource pool size or the system bandwidth is a certain value or more, it is expected that less collision occurs due to a sufficient resource, whereby more repetitions may be granted to obtain a wider D2D range. Generally, the repetition times (unit size) according to the resource pool size (or system bandwidth) may be determined previously by random steps. For example, a frequency size (or system bandwidth size) of the D2D resource pool may be divided into N steps, and repetition times (or unit size) per step may be determined previously. In another way, the repetition times may be determined in accordance with the unit size (PRB size) of the D2D signal or information bit size. For example, if the unit size is A PRB pair, the repetition times may be configured to 'a', and if the unit size is B PRB pair, the repetition times may be configured to 'b'. For another example, if the information bit size is a certain value or more, the repetition times may be configured to 'c', and if the information bit size is a certain value or less, the repetition times may be configured to 'd'. This method is to assure a certain coding rate when the unit size of the D2D signal is configured to a small value, or increase the repetition times to obtain energy gain. If the unit size is configured to a certain value or more, since sufficient coding gain may be obtained, waste of unnecessary resources may be avoided by configuration having no repetition or reducing the repetition times. If the unit size of the D2D signal is fixed, a sufficient coding rate cannot be obtained when the information bit size is too great, whereby sufficient D2D coverage cannot be obtained. In this case, the repetition times may be increased to lower an effective coding rate or obtain energy gain. This resource size (or system bandwidth) or the repetition times (or unit size) according to the D2D signal unit size or information bit size may be configured separately per SA (Scheduling Assignment), type 1 discovery, and type 2 discovery, and may partially be used as a value which will be signaled by the network. For example, supposing that the type 1 discovery and the type 2 discovery are always operated within the network, the repetition times (or unit size) per resource pool for the two the D2D signals may always be used as the value configured by the network, without being determined previously. However, in case of SA, the repetition times (or unit size) which is configured previously may be required when a D2D communication packet is transmitted out of coverage. At this time, the repetition times (or unit size) which is configured previously may be used by the system bandwidth. Meanwhile, the repetition times (unit size) which is configured previously may be determined previously in accordance with the size (or system bandwidth) of the resource pool, and if the network indicates the repetition times (or unit size) through a higher layer signal, the indicated repetition times (or unit size) may be configured. Alternatively, in partial network coverage, if the repetition times is indicated by another UE through a PSBCH or higher layer (or another physical layer in addition to PSBCH) D2D signal, a rule may be determined such that the corresponding repetition times (or unit size) may be used.

In accordance with the aforementioned configuration, the problem (difference in discovery performance between cell edge UE and cell center UE) that may occur during open loop power control performed to protect PUCCH transmission may be solved.

Restriction of Frequency Resource Region

Figure 7:
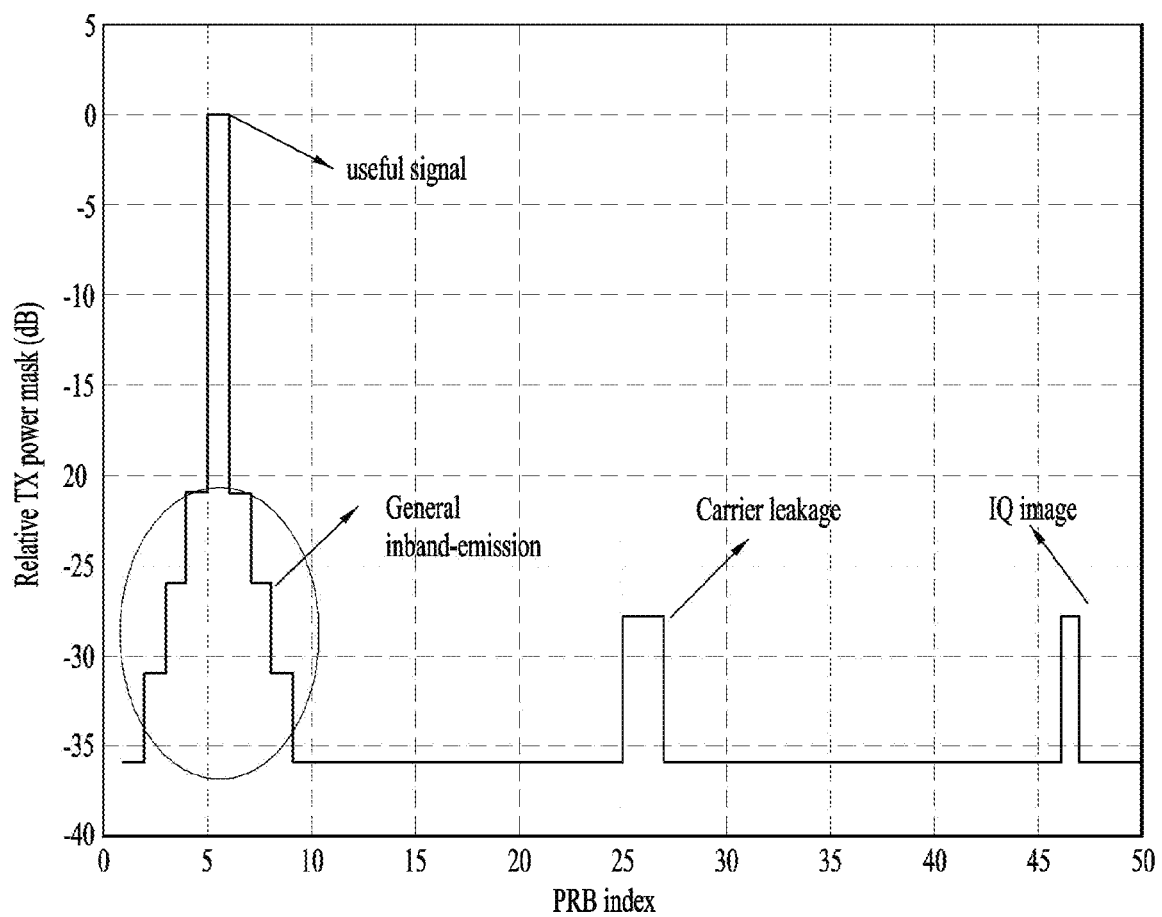

In discovery signal transmission, as another method for reducing interference on PUCCH transmission, a frequency resource region may be restricted. If a UE which is close to the eNB transmits a discovery signal by using a resource near a PUCCH resource, serious interference may occur in a PUCCH region due to inband emission (particularly, EVM-shoulder determined in accordance with EVM requirement) of the discovery signal. Referring to FIG. 7, if a region marked with a circle is overlapped with the PUCCH region (a region next to a useful signal is overlapped with the PUCCH resource), serious interference may occur in the PUCCH. Therefore, the resource region for the discovery signal may be restricted on a frequency axis, whereby the resource near the PUCCH resource cannot be used for D2D discovery signal transmission. This transmission restriction of the frequency resource region (or available frequency region) may be applied selectively depending on signal strength (RSRP or RSRQ) of the eNB, and thus a required threshold value of signal strength of the eNB and restricted transmission region (or available frequency region) may previously be indicated to the UE through a higher layer signal (for example, RRC) or a physical layer signal (for example, (E)PDCCH or SIB).

As a detailed example, referring to FIG. 6, UEs (UE group #1) having RSRP of a previously configured value or more may be restricted so as not to use a resource pool 2. This may be understood that a mapping relation between a resource pool and RSRP is defined in the aforementioned embodiment in which a resource pool is configured per RSRP. That is, the resource pool may be configured per RSRP, but may be configured to be far away from the PUCCH region if RSRP becomes great. That is, in FIG. 6, resource usage regions of the UE group #1 and the UE group #2 are configured to be detached from each other on the frequency. The available frequency region according to previously received signal strength (RSRP or RSRQ) from the eNB may be configured previously, or may be indicated to the UE through a higher layer signal (for example, RRC) or a physical layer signal (for example, (E)PDCCH or SIB).

The aforementioned identification of the frequency resource region according to signal strength of the eNB may be implemented by identification of a frequency resource according to a transmission power of a UE. For example, a UE having a transmission power of 'a' dBm or more (or maximum transmission power of XdBm) may transmit a D2D signal at a resource region of the UE group 1 of FIG. 6, and a UE having a transmission power of 'a' dBm or less (or maximum transmission power of YdBm) may use a resource region of the UE group 2. For this operation, a transmission power per resource region or a range of the transmission power or a representative value of a transmission power for indicating a range of the transmission power may be determined previously, or may be signaled to the UE through a physical layer or higher layer signal.

Meanwhile, the identification of the frequency resource region may be implemented by a change of the transmission probability not an explicit change of the resource region. For example, a UE of which received signal strength from the eNB is a certain threshold value or more may configure a transmission probability of the discovery signal near the PUCCH region at a value obtained by reducing a certain offset (>0) from an average value or a previously set value. In this way, the transmission probability per frequency region may be configured differently to protect the PUCCH resource, whereby the UE located near the eNB may hardly perform signal transmission at the RB near the PUCCH resource. The transmission probability per RB in the frequency domain may be a function of received signal strength of the eNB, and if the received signal strength of the eNB becomes great, the transmission probability of the RB near the PUCCH resource may be lowered, and if the received signal strength of the eNB becomes small, the transmission probability of the RB near the PUCCH resource may be increased. The transmission probability per RB in the frequency domain may be controlled by applying offset per average transmission probability. At this time, the offset value may be set to be greater at the RB near the PUCCH resource if the signal strength of the eNB becomes greater and to be smaller at the RB near the PUCCH resource if the signal strength of the eNB becomes smaller. As another example, specific offset for the transmission probability may previously be configured for the UE (previously configured or signaled through a higher layer signal such as RRC), and whether to apply this offset may be configured in accordance with the received signal strength from the eNB.

Transmission Power which is Configured Differently in Accordance with Frequency Location As an example of mitigating the aforementioned restriction of the frequency resource region, use of the resource near the PUCCH resource may be granted even though the RSRP is a threshold value or more but a discovery transmission power may be restricted. That is, the UEs of UE group #1 in FIG. 6 may be configured to select the resource pool 2 but their transmission power is restricted if the UEs transmit a discovery signal at the resource pool 2. At this time, although a maximum transmission power may be restricted, a minimum transmission power $P_{0\_D2D\_Discovery}$ may be configured differently per frequency resource. For example, the UEs of UE group #2 in FIG. 6 may be configured to transmit the discovery signal near the PUCCH resource region at only a power of a certain threshold value, and $P_{0\_D2D\_Discovery}$ may be configured near the PUCCH region to be smaller than the other region. The maximum transmission power per frequency region may be defined as a function according to the received signal strength from the eNB. For example, the maximum transmission power near the PUCCH region may be configured to be smaller if the received signal strength from the eNB becomes greater, and the maximum transmission power near the PUCCH region may be configured to be greater if the received signal strength from the eNB becomes smaller.

PUCCH Power Control

The aforementioned descriptions relate to methods for restriction (for example, selection of resource pool, determination of frequency domain, transmission power control, etc.) of a discovery signal in a relation between discovery signal transmission and PUCCH transmission. Unlike these methods, interference mitigation may be achieved in view of PUCCH power control. That is, in a region to which the discovery signal will be transmitted, PUCCH power control is configured differently from power control at a subframe having no relation with discovery signal transmission. In other words, a transmission power used for PUCCH transmission at a subframe to which the discovery signal is transmitted may be configured to be greater than that used for PUCCH transmission at a subframe to which the discovery signal is not transmitted.

In detail, PUCCH power control according to the embodiment of the present invention may be performed by the following Equation 5. A unit of PUCCH power control is dBm.

Equation 5

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\}$$ [Equation 5]

$P_{O\_PUCCH}$ is a value indicated by a higher layer. In the present invention, at the SF to which the discovery signal is transmitted, separate $P_{O\_PUCCH}$ may be indicated through a higher layer signal (for example, RRC signaling), whereby a different transmission power may be used. In this case, $P_{O\_PUCCH}$ may be divided into $P_{UE\_PUCCH}$ and $P_{O\_NOMINAL\_PUCCH}$, wherein only $P_{UE\_PUCCH}$ may be indicated through a separate higher layer signal (for example, RRC signaling) to boost a power for only UEs that transmit a PUCCH at the subframe to which the discovery signal is transmitted. Alternatively, as another implementation method, a predetermined offset may be applied to the legacy $P_{UE\_PUCCH}$ and may be indicated through a higher layer. In the above Equation, description of the other factors will be replaced with the aforementioned description related to uplink power control.

The PUCCH transmission power is boosted as above, whereby specificity when the discovery signal is transmitted may be reflected. In more detail, if an RRC idle mode UE may transmit the discovery signal, since the UE that transmits the discovery signal cannot know a timing advance (TA), the UE transmits the signal at a timing different from the transmission timing of the legacy uplink signal. This may cause a factor that the eNB may lose orthogonality with the legacy uplink signal. For this reason, high interference may be observed at the subframe to which the discovery signal is transmitted, due to ICI. Therefore, in this case, the PUCCH transmission power may be boosted, whereby stable PUCCH transmission may be obtained

SRS Power Control

In the same context, SRS power may be more boosted than the legacy operation at the subframe to which the discovery signal is transmitted. If SRS is transmitted at the subframe to which the discovery signal is transmitted, since higher interference may occur than the other subframes, the network may indicate that the SRS may be transmitted with a high power at the corresponding subframe. The legacy SRS power control is as expressed by the following Equation 6, and its unit is dBm.

Equation 6

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$ [Equation 6]

$P_{O\_PUSCH,c}$ and $\alpha_c$ are values indicated by a higher layer. If the SRS is transmitted at the subframe to which the discovery signal is transmitted, a value different from that of the subframe to which the discovery signal is not transmitted may be indicated by the network. This value may be indicated to the UE by a higher layer signal (for example, RRC signaling). In this case, $P_{O\_PUSCH,c}$ is indicated by being divided into $P_{UE\_PUCCH,c}$ and $P_{O\_NOMINAL\_PUCCH,c}$, wherein only $P_{UE\_PUCCH,c}$ may be signaled to the UE through a separate higher layer signal to apply SRS power boosting to only the UE that transmits the SRS at the subframe to which the discovery signal is transmitted. Also, if the SRS is transmitted at the subframe to which the discovery signal is transmitted, $P_{SRS\_OFFSET,c}$ may also be signaled to the UE through a separate higher layer signal (for example, RRC signaling).

In the aforementioned PUCCH and SRS power control methods, a transmission power is additionally applied on the assumption that the discovery signal is transmitted. If the discovery signal is transmitted hardly, it may be an unnecessary operation or received quality of the discovery signal may be deteriorated seriously due to PUCCH and SRS power boosting. To solve this problem, the PUCCH and/or SRS power boosting operation may be applied selectively only if the discovery signal is observed at a certain threshold value or more. For example, the UE that transmits the PUCCH signal or SRS may be determined previously to observe (for example, perform energy sensing in a region (or PUSCH region) to which the discovery signal is transmitted) the discovery signal for a certain window before transmitting the PUCCH signal or SRS and selectively perform transmission only if a signal or received power of a certain threshold value or more is observed.

The aforementioned methods for reducing interference between the D2D signal (for example, discovery signal) and the PUCCH signal may be used in combination of one or more. For example, a discovery resource pool may be selected in accordance with signal strength of the eNB, wherein the transmission power during PUCCH transmission at the subframe to which the discovery signal is transmitted may be configured to be greater than that at the subframe to which the discovery signal is not transmitted. As another example, power control according to signal strength of the eNB and resource identification methods (resource pool configuration per RSRP, restriction of the frequency resource region, etc.) may be used together.

Meanwhile, the aforementioned methods may be used selectively depending on configuration of a CP length. If a CP in which a cellular signal and a discovery signal are the same as each other is configured, an effect caused by inband emission is considered. However, if different CPs are configured, ICI caused as orthogonality is not maintained should be considered in addition to inband emission. Therefore, if a CP length of a WAN (wide-area network) (for example, cellular) signal and a CP length of a discovery signal are the same as each other, restriction of the aforementioned frequency use region is only used. However, if the CP length of the WAN signal and the CP length of the discovery signal are different from each other, restriction of the aforementioned frequency use region, PUCCH power control and SRS power control may be used together.

The suggested methods are not limited to only transmission of the discovery signal, and some of the suggested methods may selectively be applied when the D2D communication signal, scheduling assignment for communication, or the D2D synchronization signal is transmitted. (Embodiment related to a transmission power of a synchronization signal will be described later.) In this case, scheduling assignment refers to a control signal that includes a transmission resource location of a D2D communication packet and ID before the D2D communication packet is transmitted. Also, the same power control parameter may be used in a power control part if the D2D transmission signal is varied, or a separate parameter (for example, P0, alpha, power offset, etc.) different per signal may be configured/signaled to the power control part.

In the suggested methods, different methods may be applied depending on the D2D signal. For example, closed-loop power control may be used in case of transmission of a mode of the D2D communication signal, which is operated under the control of the eNB. However, some of the suggested methods may be applied to the case of a mode of the D2D communication signal, which is operated under the status having no separate control of the eNB.

Hereinafter, the embodiment of the present invention, which is related to a transmission power of the D2D synchronization signal, will be described. A D2D link means a sidelink, and thus the D2D synchronization signal may be referred to as a sidelink synchronization signal. In the same context, a primary D2D synchronization signal may be referred to as a PSSS (primary sidelink synchronization signal), and a secondary D2D synchronization signal may be referred to as an SSSS (Secondary sidelink synchronization signal).

Figure 8:
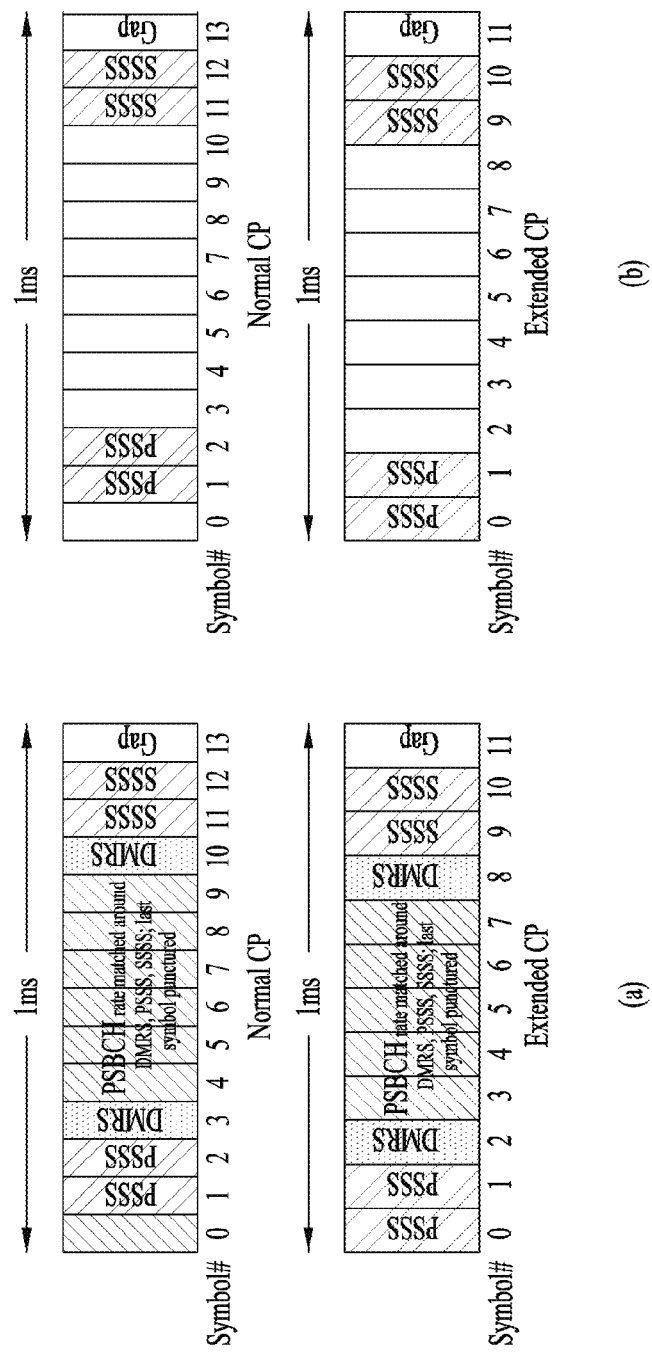
FIGS. 8 and 9 are diagrams showing a subframe at which a synchronization signal is transmitted according to one embodiment of the present invention.
Figure 9:
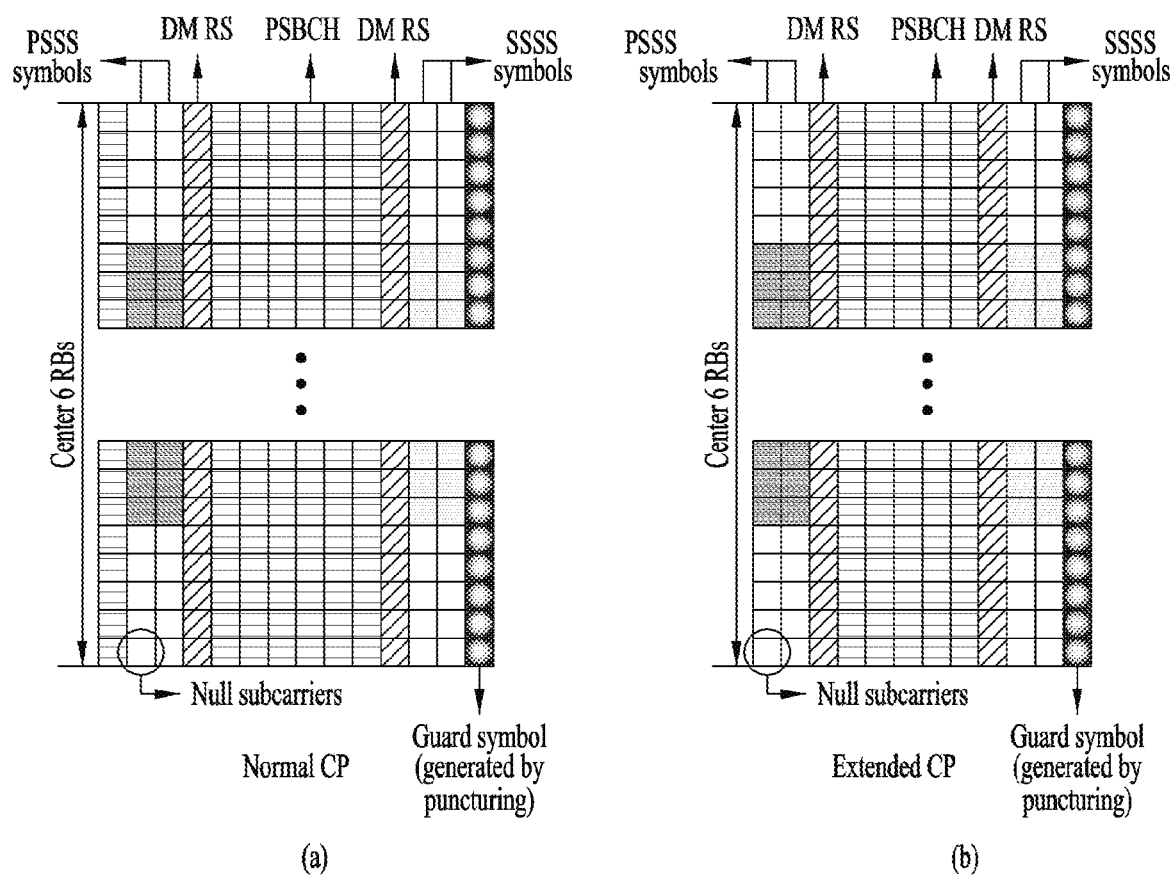

The following description may be applied to a subframe structure related to a synchronization signal as shown in FIGS. 8 and 9. A structure of each symbol and signal is shown in FIG. 8(*a*) in the case that a PSBCH is transmitted at a subframe to which the PSSS and SSSS are transmitted (that is, the case that synchronization signal and PSBCH are multiplexed), and a structure of each symbol and signal is shown in FIG. 8(*b*) in the case that a PSBCH is not transmitted at a subframe to which the PSSS and SSSS are transmitted (that is, the case that synchronization signal and PSBCH are not multiplexed). FIG. 8(*a*) may be a subframe structure used in case of communication, and FIG. 8(*b*) may be a subframe structure used in case of discovery. A detailed structure of a subframe to which a synchronization signal is transmitted in case of normal CP and a detailed structure of a subframe to which a synchronization signal is transmitted in case of extended CP are respectively shown in FIGS. 9(*a*) and 9(*b*). Particularly, the case that the synchronization signal and the PSBCH are multiplexed is shown in FIG. 9, and a part in addition to the shown PSBCH transmission RE may be applied to the case that the synchronization signal and the PSBCH are not multiplexed.

Figure 10:
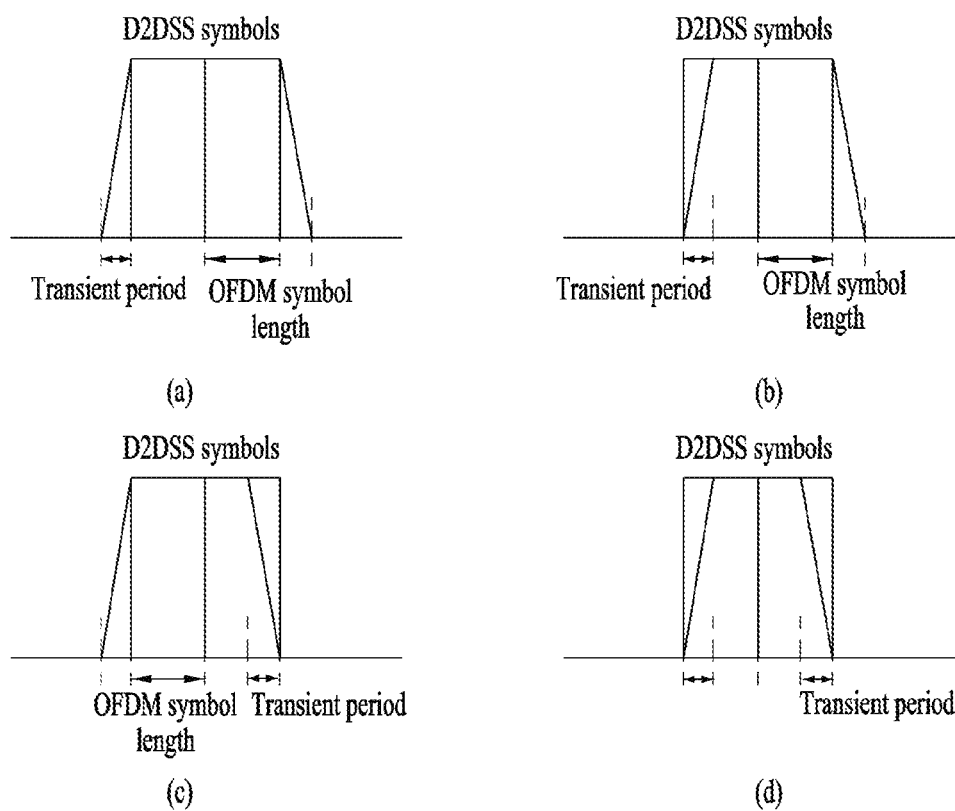
FIGS. 10 to 18 are diagrams showing various examples of a mask according to the embodiment of the present invention.

Transmission Power Configuration Related to Synchronization Signal and Power Mask An example of a power mask according to the embodiment of the present invention is shown in FIG. 10. The UE according to the embodiment of the present invention may transmit a D2D synchronization signal while satisfying the power mask which will be described hereinafter. All or some of the methods which will be described hereinafter may be used for transmission power mask configuration of a PSDCH (Physical sidelink discovery channel) and a PSCCH (Physical sidelink control channel). In the legacy PUSCH/PUCCH/SRS transmission, the transmission power mask may be described as follows. i) If different signals are adjacent to a symbol or subframe adjacent to PUSCH/PUCCH/SRS, an transient period of 40 us is configured, ii) if no signal is transmitted to a symbol or subframe adjacent to PUSCH/PUCCH/SRS, an transient period of 20 us is configured, and iii) the transient period may be arranged outside a symbol having high importance if importance of the transmitted symbol is high. Importance has the order of SRS>PUCCH/PUSCH. For example, when the SRS is transmitted at the same subframe as that of the PUSCH, the transient period is arranged outside the SRS symbol, wherein the transient period of 40 us is arranged at the front of the SRS, the transient period of 40 us is arranged when the symbol is transmitted at the rear of the SRS, and the transient period of 20 us is arranged when no symbol is transmitted. iv) If signals having the same importance are adjacent to each other and their transmission powers are different from each other, the transient period of 20 us is configured for each symbol.

A power mask configured not to include the transient period in the symbol to which the D2DSS is transmitted is shown in FIG. 10(*a*). That is, the power mask may be configured not to generate power transition during transmission of the synchronization signal, whereby ICI (inter-carrier interference) may be prevented from occurring during sequence detection. A size/length of the transient period may be 20 us which is a maximum transient period of an LTE UE for commercial use, or may be set to a value smaller than 20 us. For example, a shorter transient period (for example, 10 us/5 us) may be configured if the D2DSS is transmitted at an unlicensed band. The shorter transient period may be configured as a time period used for filtering becomes short due to a spectrum mask restriction requirement of the unlicensed band, which is looser than that of a licensed band. The size of the transient period may be changed depending on a signal transmitted from a neighboring symbol of the symbol from which the synchronization signal is transmitted. For example, the length of the transient period may be set to be smaller than 20 us only if an RS (for example, DMRS) is transmitted to the neighboring symbol of the symbol from which the synchronization signal is transmitted. This is because that a corresponding symbol may be subjected to ICI and thus performance may be deteriorated if the transient period is arranged at a specific RS.

In an example of FIG. 10(*b*), a power mask is configured to include a power transient period in a first one of two symbols to which a D2D synchronization signal is transmitted. This example may be useful when a symbol (for example, WAN PUSCH, PUCCH, SRS, DMRS, etc.) to be protected with greater importance is transmitted to the preceding symbol of the D2D synchronization signal.

Unlike FIG. 10(*b*) in an example of FIG. 10(*c*), a second one of two symbols to which a D2D synchronization signal is transmitted includes a transient period. In an example of FIG. 10(*d*), both of two symbols to which a D2D synchronization signal is transmitted include a transient period.

Figure 11:
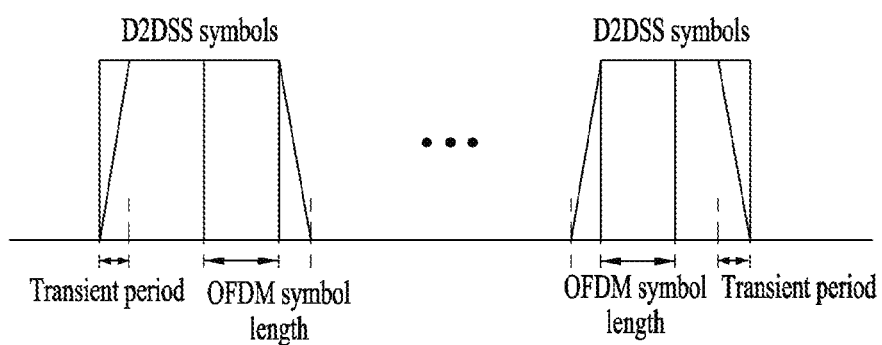

In FIG. 10, the D2DSS may be a PSSS or an SSSS. The power mask in each example shown in FIG. 10 may commonly be applied to the PSSS and the SSSS, or may be applied to the PSSS and the SSSS in a combination type. In other words, a power mask system of any one of the respective examples in FIG. 10 may commonly be applied to the PSSS and the SSSS, or the mask applied to the PSSS and the mask applied to the SSSS may be different from each other. In an example of FIG. 11, the mask of FIG. 10(b) is applied to the PSSS, and the mask of FIG. 10(c) is applied to the SSSS.

Figure 12:
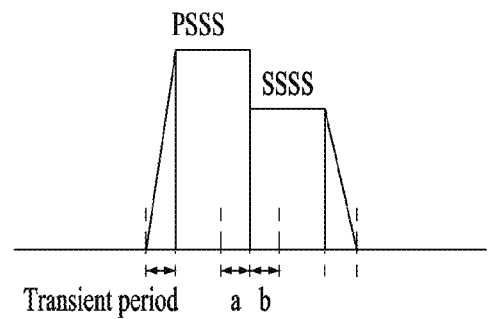

Subsequently, an example of a power mask corresponding to a case that the PSSS and the SSSS are transmitted continuously and their transmission power sizes are different from each other is shown in FIG. 12. In this case, power backoff is performed due to a problem of PAPR of the SSSS. If the PSSS and the SSSS are transmitted continuously, a power transient period may be included in one of the PSSS and the SSSS, or may be included in both of them. The power transient period may be included in one of the PSSS and the SSSS, whereby distortion may occur in only one D2DSS. For example, the power transient period may be included in the SSSS. (The transient period 'b' is only configured in FIG. 12.) In this case, it is advantageous that the PSSS may perform detection without ICI, whereas the SSSS may be subjected to ICI due to power transition. Since power backoff is already set to the SSSS, a problem occurs in that SNR is more unfavorable for the SSSS than the PSSS. To solve this problem, it may be considered that the transient period between the two symbols is included in the PSSS only. ('a' in FIG. 12 is only set as the transient period.) The method for configuring the transient period in a PSSS symbol region may be operated selectively only if a difference in a transmission power between the PSSS and the SSSS is a certain threshold value or more (a power backoff size of the SSSS is a certain threshold value or more). In this case, the size (a and/or b) of the transient period between the D2DSS may be the same as the length of the transient period at the front and the rear of the D2DSS symbol, or may be set to a value smaller than the length of the transient period at the front and the rear of the D2DSS. This is because that the transient period may be configured to a short size as the difference in a transmission power between the D2DSS symbols may not be great.

In the aforementioned method for configuring the power mask of the D2DSS, if a transmission power of a channel multiplexed with the D2DSS is the same as that of the D2DSS and/or a power control parameter of the channel multiplexed with the D2DSS is the same as that of the D2DSS and/or a frequency resource of the channel multiplexed with the D2DSS is the same as that of the D2DSS, one mask may be configured at the edge of the channel multiplexed with the D2DSS without a separate power mask. For example, if the D2DSS (PSSS) and the PSBCH are configured to be transmitted at a specific SF by using the same power or the same power control parameter and/or the frequency resources used by the D2DSS and the PSBCH are the same as each other, a separate mask may be required between the D2DSS and the PSBCH, and the D2DSS and the PSBCH transmit signals by using one mask. Also, the power masks may be configured differently depending on the presence of the multiplexed channel. If the PSBCH and the D2DSS are transmitted at the same time, the SSSS and the DMRS are transmitted from a symbol next to the PSBCH and the D2DSS, wherein power backoff may be applied to the SSSS due to high PAPR of the SSSS as described above. At this time, the transient period should be configured. The transient period of 40 us may be arranged at the first symbol period of the SSSS, and the transient period of 20 us may be configured to each of the DMRS and SSSS symbols. Alternatively, the transient period of 40 us may be arranged at the DMRS. Since no symbol is transmitted to the rear of the SSSS due to a gap, the transient period of 20 us may be configured to the rear of the SSSS.

In case of extended CP, since the PSSS is transmitted to the first symbol, the method for configuring the transient period may be varied depending on which signal is transmitted to a previous one of the subframe to which the synchronization signal is transmitted. PUSCH/PUCCH, SRS and D2D signals may be transmitted to the previous subframe or no signal may be transmitted thereto. The D2D signal may be subdivided into a D2D signal transmitted at a DL timing and a D2D signal transmitted at a UL timing. Even in case of the extended CP, the transient period may be arranged at the front of the PSSS transmission symbol as shown in FIG. 10(a) to assure detection of the PSSS. In this case, the eNB may configure a cell-specific SRS at the previous subframe of the D2DSS, whereby the last symbol may be subjected to nulling. In this case, since the symbol just before D2DSS subframe transmission is always empty, the transient period of 20 us may be configured. If not so, the size of the transient period may be configured depending on the size of TA. A detailed method for configuring the transient period will be described later.

The transient period may be arranged inside the PSSS symbol as shown in FIG. 10(b). If the D2D signal is transmitted at a previous subframe, the transient period of 20 us may be arranged at the front of the PSSS symbol. In accordance with this configuration, legacy cellular signal transmission may not be affected by the case that the PUSCH/PUCCH or SRS is transmitted at the previous subframe.

Figure 13:
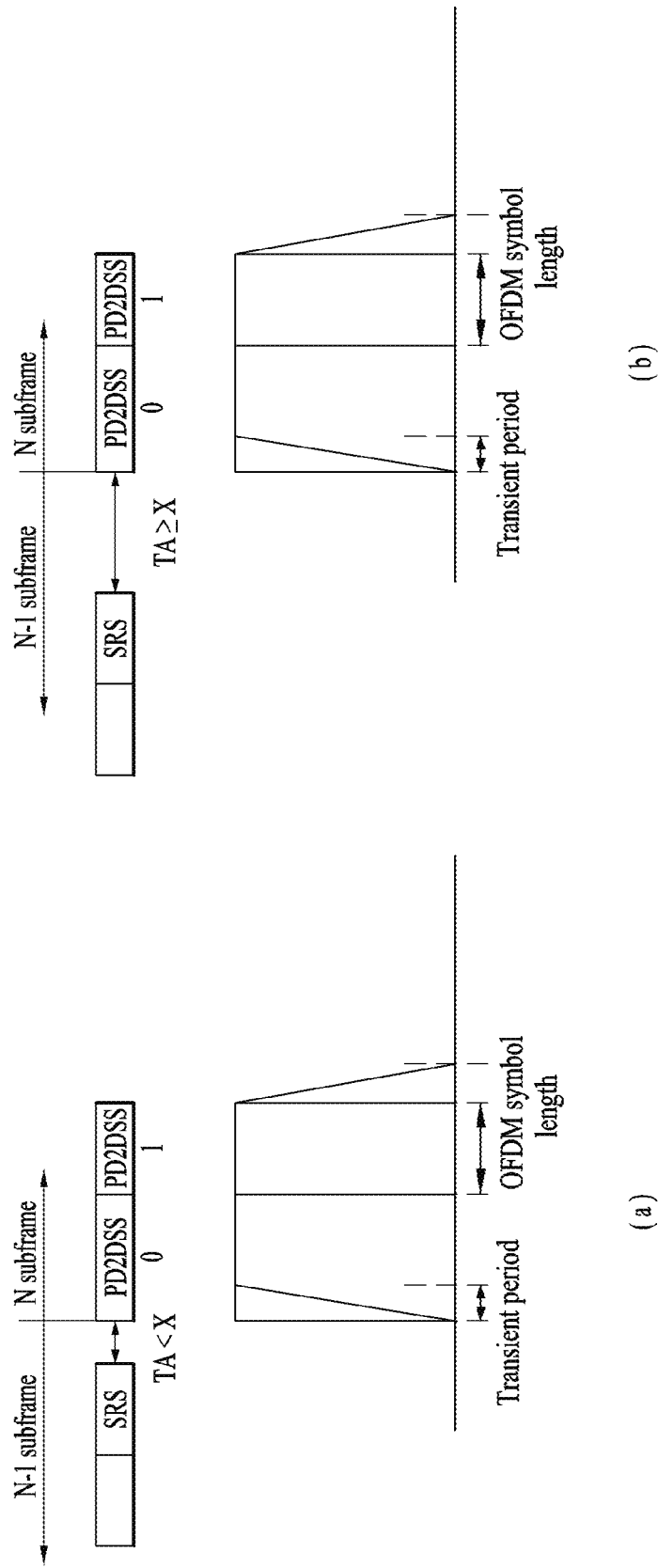

The location of the transient period may be configured differently depending on the size of TA. Since the D2DSS is transmitted at a DL timing and the PUSCH/PUCCH or SRS is transmitted at a UL timing, a gap occurs depending on the size of TA even though the signal is transmitted at the previous subframe, whereby no signal may be transmitted for a certain period just before the PSSS. In detail, if TA is Xus or more (or exceeds, for example, X may be 20 us or 40 us), the transient period of 20 us may be arranged at the front of the PSSS symbol, and if TA is less than Xus (or if TA is Xus or less), the transient period (or the transient period may be configured to 40 us or as much as length obtained by subtracting TA from 40 us or 20 us or as much as length obtained by subtracting TA from 20 us) may be arranged inside the PSSS symbol. FIGS. 13(a) and 13(b) illustrate embodiments that transient period configuration is varied depending on the size of TA. As another embodiment, the power mask may be categorized into three types depending on the size of TA. For example, if TA is less than X1 us, a power mask that arranges the transient period inside the PSSS as shown in FIG. 13(a) may be used, and the transient period may be configured to 40 us or a size obtained by subtracting TA length from 40 us. If TA is X1 us or more or less than X2, a power mask that arranges the transient period inside the PSSS as shown in FIG. 13(a) may be used, and the transient period may be configured to 20 us. If TA is X2 us or more, a power mask that arranges the transient period outside the PSSS symbol as shown in FIG. 13(b) may be used, and the transient period may be configured to 20 us.

A method for always configuring the transient period inside the PSSS if the SRS is transmitted at a previous subframe of the D2DSS and always arranging the transient period outside the PSSS if the PUSCH/PUCCH/D2D signal is transmitted may be used. This is to configure the transient period so as not to affect SRS transmission, thereby assuring sequence detection performance in case of the SRS although performance degradation may not be great, even if the transient period occurs at some symbols, due to codeword transmission in case of PUSCH/PUCCH/D2D. At this time, in case of PUSCH/PUCCH, the size of the transient period may be configured to 20 us or 40 us depending on the size of TA, and in case of D2D, the size of the transient period may be configured to 20 us because the last symbol is always punctured.

If a signal is transmitted at the front of the D2DSS, the transient period of 20 us may be configured to always exist inside the PSSS. However, since the transient period is configured outside SRS symbols in the legacy SRS power mask, the SRS may be excluded from this method. If the SRS is transmitted, any one of the aforementioned methods may be used.

Figure 14:
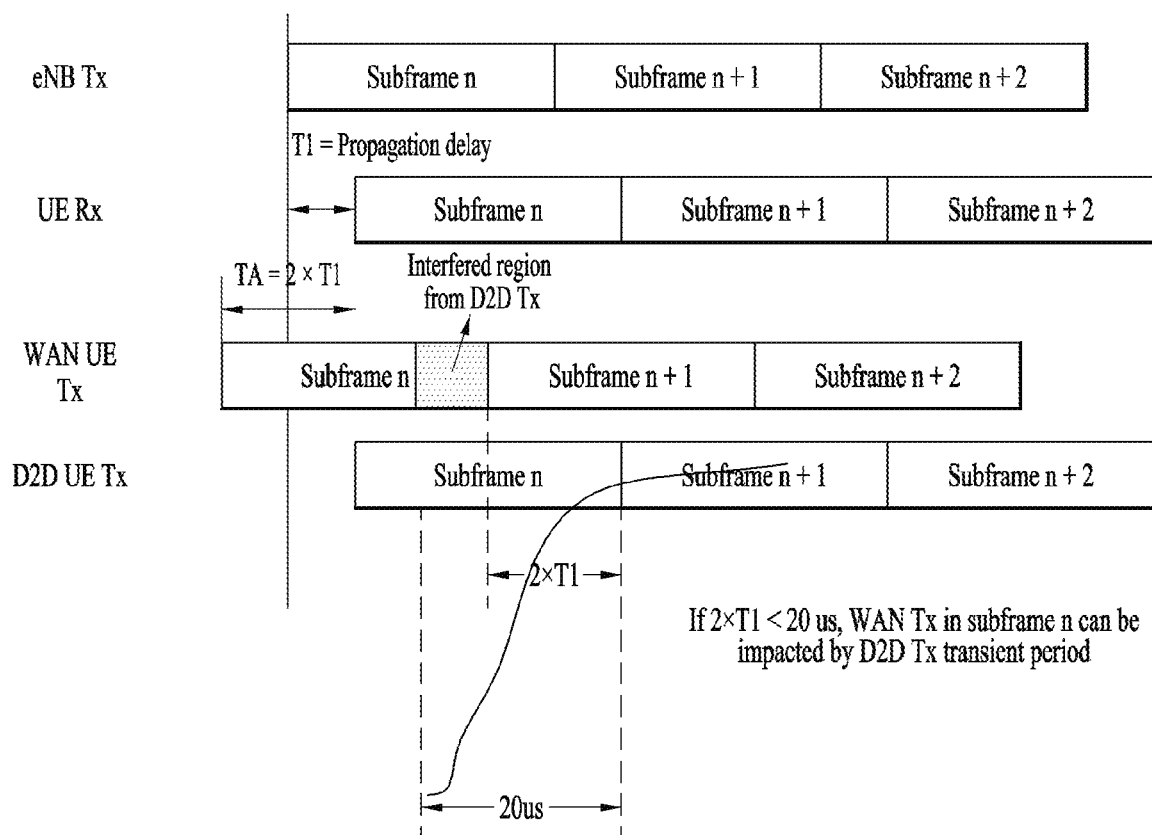

Subsequently, D2D synchronization signal transmission and a mask applied to the D2D synchronization signal transmission according to the embodiment of the present invention will be described. The mask which has been described as above and will be described hereinafter may be intended to protect WAN transmission from D2D transmission as illustrated in FIG. 14.

Figure 15:
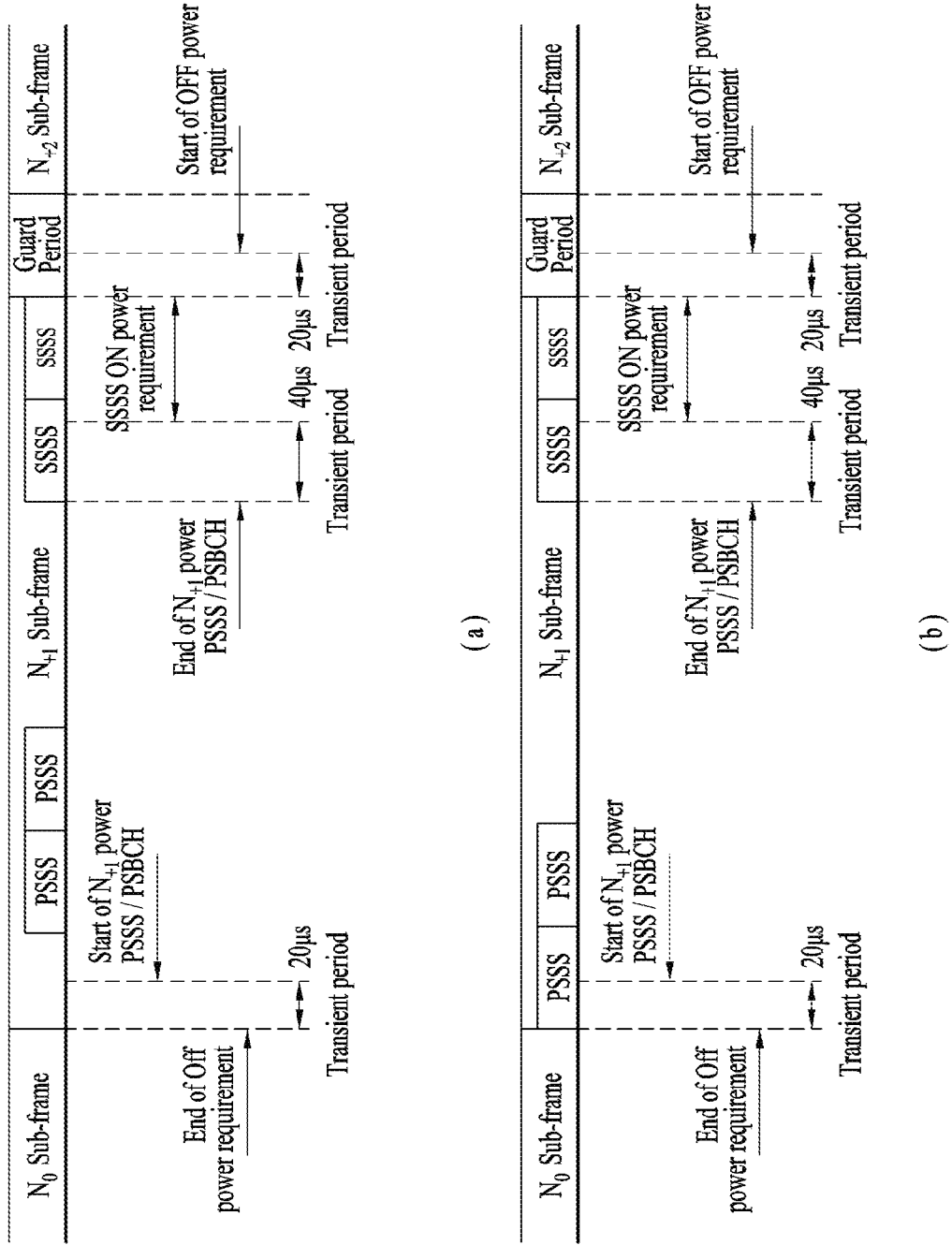

Referring to FIG. 15, when (a processor) of a D2D UE that includes a transmission module, a reception module, and a processor generates and transmits a PSSS and an SSSS, or in a method for generating and transmitting a PSSS and an SSSS, if a PSBCH is transmitted from a subframe on which the PSSS and the SSSS are transmitted (that is, if a synchronization signal and a PSBCH are multiplexed), and in case of normal CP (FIG. 15(a)), the PSSS and PSBCH ON power is an average power of a period over the subframe on which the PSSS and the SSSS are transmitted excluding transient periods, and the transient period of the starting part of the period for the PSSS and the PSBCH ON power may not be overlapped with OFDM symbol to which the PSSS is transmitted. In other words, the transient period of the starting part of the period for the PSSS and the PSBCH ON power may be arranged at the front symbol of the OFDM symbol to which the PSSS is transmitted, and may start from a start point of the front symbol of the OFDM symbol to which the PSSS is transmitted. A length of the transient period of the starting part of the period for the PSSS and the PSBCH ON power may be configured to 20 us. The transient period of the end part of the period for the PSSS and the PSBCH ON power may be overlapped with OFDM symbol to which the SSSS is transmitted. This is because that the transient period may be configured to allow the SSSS to have a transmission power different from that of the PSSS/PSBCH. In this case, since the DMRS of the PSBCH is arranged at the front of the SSSS, the transient period is arranged inside the SSSS symbol to protect the DMRS. Particularly, since a DMRS received power of the PSBCH is measured when received quality of the D2D synchronization signal is measured, the DMRS of the PSBCH should be protected entirely. A length of the transient period of the end part of the period for the PSSS and the PSBCH ON power may be configured to 40 us. The transient period of the end part of the period for ON power of the SSSS may be arranged at next OFDM symbol of the second OFDM symbol to which the SSSS is transmitted. The next OFDM symbol may be punctured to generate a guard period as shown. The length of the transient period may be 20 us.

FIG. 15(b) shows extended CP. If the PSBCH is transmitted at the subframe on which the PSSS and the SSSS are transmitted, and in case of extended CP, the PSSS and PSBCH ON power is an average power of a period over the subframe on which the PSSS and the SSSS are transmitted excluding transient periods, and the transient period of the starting part of the period for the PSSS and the PSBCH ON power may be overlapped with OFDM symbol to which the PSSS is transmitted. The transient period of the starting part of the period for the PSSS and the PSBCH ON power may be arranged at the OFDM symbol to which the PSSS is transmitted. If a cellular signal is transmitted at the previous subframe, since interference may occur when the transient period is arranged outside the PSSS, the transient period is arranged at the first symbol of the PSSS to protect the cellular signal. The transient period of the end part of the period for the PSSS and PSBCH ON power and the transient period related to the SSSS are the same as those in the description of FIG. 15(a).

Figure 16:
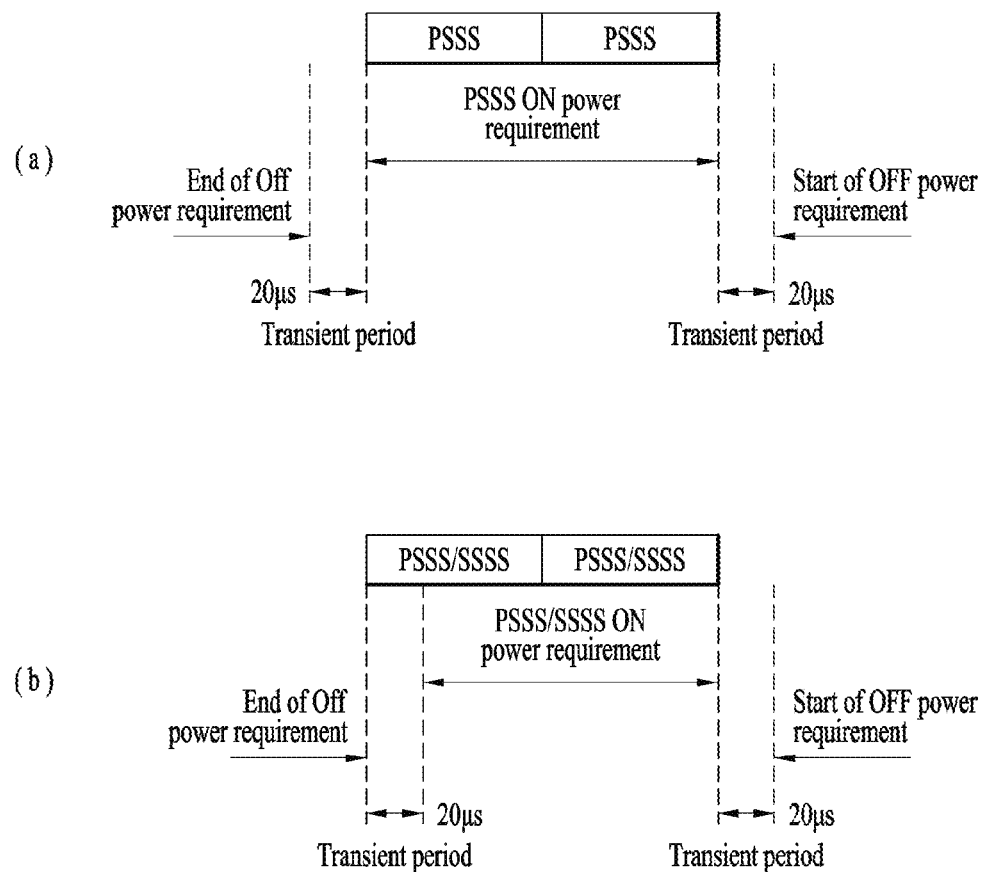
Figure 17:
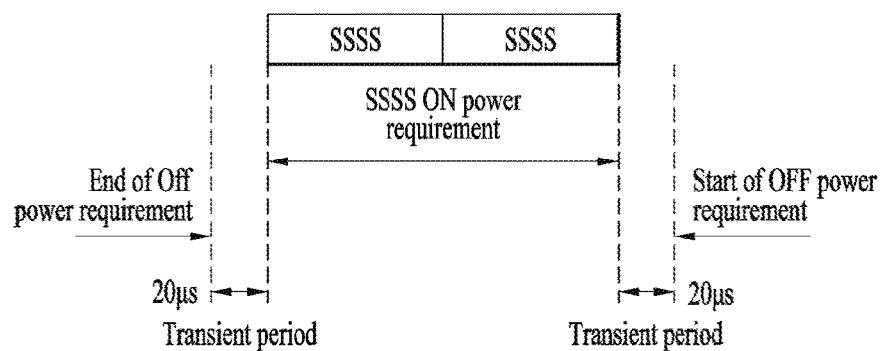

Referring to FIG. 16, if a PSBCH is not transmitted from a subframe on which the PSSS and the SSSS are transmitted (that is, if a synchronization signal and a PSBCH are not multiplexed), and in case of normal CP, the transient period of the starting part of the period for the PSSS ON power may not be overlapped with OFDM symbol to which the PSSS is transmitted. If the PSBCH is not transmitted from the subframe on which the PSSS and the SSSS are transmitted, and in case of extended CP, the transient period of the starting part of the period for the PSSS ON power may be overlapped with the OFDM symbol to which the PSSS is transmitted. If the PSBCH is not transmitted from the subframe on which the PSSS and the SSSS are transmitted, the transient period of the starting part of the period for ON power of the SSSS may not be overlapped with the OFDM symbol to which the SSSS is transmitted, regardless of CP length. This is because that the transient period is arranged outside the SSSS symbols as no signal is transmitted to the periphery of the SSSS if the PSBCH is not transmitted. This example is shown in FIG. 17.

Figure 18:
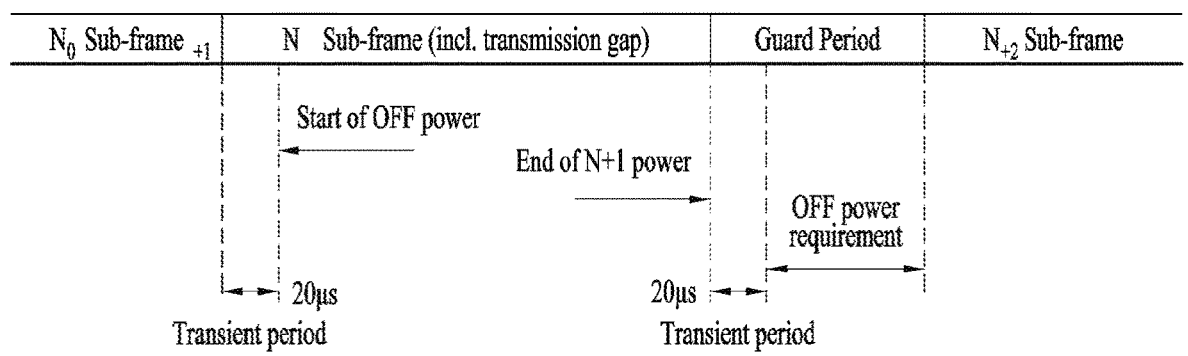

Meanwhile, a PSDCH/PSCCH/PSSCH time mask may be the same as that shown in FIG. 18.

Relation of Transmission Power Between PSBCH and PSSS

As described above, if the PSBCH which is a channel to which system and synchronization related information is transmitted and the PSSS are transmitted from the same subframe, that is, if the PSBCH and the PSSS are multiplexed in the time domain (in other words, if the PSBCH and the D2DSS are transmitted together from one subframe), a transmission power of the PSSS and a transmission power of the PSBCH may be the same as each other. Although described later in detail, this is to allow the power transient period not to be generated by failing to generate a power difference when various kinds of signals are transmitted within one subframe. In this way, as the powers are configured to be the same as each other, a separate power transient period is not arranged between signals within one subframe, whereby signal distortion due to occurrence of the transient period may be removed. That is, the transmission power of the PSSS may be determined considering a difference between the number (62) of REs into which the PSSS is mapped on one OFDM symbol and the number (72) of REs to which the system and synchronization related information is mapped on one OFDM symbol. The PSSS and the PSBCH may be transmitted on 6 RBs at the center of a full bandwidth as illustrated in FIG. 9. Of course, the reference signal and the SSSS may be transmitted together from the above subframe. Moreover, a transmission power of the PSBCH reference signal and a transmission power of the PBSCH data symbol may be the same as each other.

Meanwhile, the PSSS and the SSSS may be transmitted at their respective transmission powers different from each other due to PAPR. At this time, this difference between the transmission powers may mean a difference in PSD (power spectrum density) in the frequency domain, or may mean that the transmission powers are configured differently from each other in the time domain. Therefore, a backoff value based on PSD or a backoff value based on a transmission power per symbol may be used as a power backoff value of the aforementioned SSSS. As described above, the configuration of the transmission power of the D2DSS and the transmission power of the PSBCH which are to be the same as each other at the subframe to which the D2DSS is transmitted may mean that the D2DSS and the PSBCH are transmitted at the same transmission power in the time domain, and may mean that there is no difference in PSD in the frequency domain. Some edge subcarriers (REs) of the D2DSS in 6 RBs at the center may not be used as guard REs. For this reason, even though PSD of the D2DSS and PSD of the PSBCH are the same as each other, a difference between the transmission powers in the time domain may occur. The transmission power of the PSBCH may be configured to be the same as that of the PSSS, and backoff may be applied to the SSSS depending on PAPR of sequence (or a predetermined backoff value may always be applied to the SSSS). At this time, the configuration that the transmission power of the PSSS and the transmission power of the PSBCH are the same as each other may mean that PSD of the PSSS and PSD Of the PSBCH are the same as each other, or may mean that powers applied to symbols are the same as each other. If the PSD of the PSSS and the PSD Of the PSBCH are the same as each other, since the number of REs used for the D2DSS is different from the number of REs used for the PSBCH, a difference substantially occurs between the transmission power of the PSSS and the transmission power of the PSBCH, whereby the transient period is required. If the D2DSS symbol is configured at a transmission power different from that of a symbol concatenated with the D2DSS symbol, a method for arranging the transient period may follow one of the aforementioned methods.

Meanwhile, if the D2DSS symbol and the DMRS symbol are concatenated with each other, the DMRS of the PSBCH may be configured at the same transmission power as that of the concatenated D2DSS without being transmitted at the same transmission power as that of the PSBCH. At this time, the same transmission power may mean the same PSD, or may mean the same transmission power in the time domain. The reason why that the transmission power of the DMRS is configured to be the same as that of the D2DSS is to prevent ICI from occurring by failing to arrange the power transient period between two concatenated RSs. If different transmission powers are applied between the DMRS and the PSBCH, it is preferable that the power transient period of the DMRS and the PSBCH is arranged at the PSBCH symbol period.

In short, the D2DSS and the PSBCH, which are transmitted at the same subframe, may be transmitted at the same transmission power. At this time, power backoff may be applied to the SSSS exceptionally. Transmission of the D2DSS and the PSBCH at the same transmission power may mean that the same PSD is configured in the frequency domain, and may mean that powers applied to symbols are the same as each other in the time domain. The DMRS of the PSBCH may be transmitted at the same transmission power as that of the PSBCH, or may be transmitted at the same transmission power as that of the concatenated D2DSS. Two DMRS symbols transmitted at one subframe may be transmitted at the same transmission power as that of the PSSS, and the first one of the two DMRS symbols may be transmitted at the same transmission power as that of the PSSS while the second one of the two DMRS symbols may be transmitted at the same transmission power as that of the SSSS. Likewise, the same transmission power may mean the same PSD, or may mean the same transmission power applied to the symbols in the time domain. In order that the power transient period is not generated within one subframe, it is preferable that the same transmission power is applied to different signals in the time domain. At this time, since there is a difference between the number of REs used for the PSSS/SSSS and the number of REs used for the PSBCH (72 REs are used for the PSBCH and 62 REs are used for the PSSS/SSSS), the same transmission power is configured in the time domain by multiplying sqrt (72/62) when the PSSS/SSSS is transmitted.

Configuration of D2DSSS Transmission Power

The D2DSS may be transmitted at a fixed transmission power. At this time, the transmission power of the D2DSS may separately be configured for discovery and communication, and may previously be fixed to a specific value, or may be signaled by a network through a physical layer or higher layer signal. For example, the transmission power may be signaled by the network through the physical layer or higher layer signal so that a D2D UE may transmit the D2DSS at a maximum transmission power.

As another method, OLPC may be applied. At this time, a separate OLPC parameter may be configured for each of the D2DSS of communication and the D2DSS of discovery. At this time, a separate OLPC parameter may be configured for each of D2DSSs (and/or D2DSSs of type 1 discovery and type 2 discovery) of communication mode 1 and communication mode 2. This is because that the mode 1 may be TPC-controlled by DCI and different interferences act on WAN due to different timings of the mode 1 and the mode 2 and thus OLPC parameters of D2D data packets may be configured differently. Also, if a plurality of resource pools are allocated to each D2D signal, a separate OLPC parameter of the D2DSS or a separate transmission power may be configured for each resource pool. To reduce signaling overhead, the OLPC parameters (alpha, P0) of the D2DSS may fully be the same as the parameters configured for D2D packet transmission of the mode 1 and the mode 2 or may partially apply a predetermined offset to the parameters (configured for mode 1 communication or mode 2 communication) configured for D2D packet transmission. At this time, the offset may be configured previously (for example, out coverage), or may be signaled by the network through the physical layer or higher layer signal (in network coverage). In case of mode 1, if a TPC is received through DCI, the D2DSS may also be transmitted by the TPC. Also, this offset may be configured for the PSSS and the SSSS differently from each other. For example, if the PAPR of the SSSS is remarkably higher than that of the PSSS, it is preferable that the PAPR is reduced through power backoff. In this case, the transmission power of the PSSS and the transmission power of the SSSS may be configured differently from each other, and may be implemented in such a manner that a predetermined offset is applied from OLPC configured for D2D packet.

Meanwhile, a cellular network installed by a specific operator may support both discovery and communication, or may support one of them. Also, discovery and communication may support a specific mode or type only. If the network supports specific D2D communication only, the OLPC parameter of the D2DSS may be determined by the OLPC parameter of the D2D signal supported by the network. For example, if the network supports type 1 discovery, the OLPC parameter configured for type 1 discovery may be used as the OLPC parameter of the D2DSS, or a predetermined offset may be configured for the OLPC parameter of the D2DSS. At this time, as the OLPC parameter offset, a separate offset may be configured for both alpha and P0, or a predetermined offset may be configured for one of them. At this time, a plurality of resource pools may be configured for a specific D2D signal, and a separate OLPC parameter may be configured for each resource pool. In this case, the D2DSS may previously be determined to be transmitted using the OLPC parameter of the specific D2D signal pool, or the network may signal OLPC parameter of a corresponding pool, which will be used to transmit the D2DSS, to the UE through a physical layer or higher layer signal. For example, a UE which transmits the D2DSS by using the OLPC parameter of type 1 discovery may be configured previously to use the OLPC parameter of the first type 1 discovery resource pool. In this case, the network has only to signal whether to follow OLPC parameter of a corresponding D2D signal (communication mode 1 or 2, or discovery type 1 or 2). The OLPC parameter of the corresponding D2D signal, which the network will follow, may be determined previously to reduce signaling. That is, in this case, the UE may transmit the D2DSS by always using OLPC parameter for a specific pool of a specific D2D signal without any signaling.

Meanwhile, even though the cellular network installed by a specific operator supports both discovery and communication, one signal of discovery and communication may be transmitted in view of a specific UE. In this case, it is suggested that the UE configures a D2DSS transmission power by using the OLPC parameter of the D2D signal transmitted therefrom. For example, the UE which transmits a type 1 discovery signal may determine a D2DSS transmission power by using the OPLC parameter of the type 1 discovery or a predetermined offset. Likewise, if there are a plurality of pools, a parameter of a corresponding pool which will be used by a corresponding D2D may be determined previously, or may be signaled through the physical layer or higher layer signal of the network.

Meanwhile, the specific UE may transmit both a discovery signal and a communication signal. In this case, it is suggested that the D2DSS close to the D2D signal transmitted from the UE uses OLPC parameter of the D2D signal. For example, a period of discovery may be longer than that of communication. Therefore, general D2DSS transmission follows OLPC parameter configured for communication, T number of D2DSSs (T may be 0, and in this case, only D2DSS transmitted within a resource pool is transmitted using OLPC parameter of the corresponding resource pool) prior to a starting part of a discovery transmission resource pool are transmitted to follow the OLPC parameter of discovery, and if the discovery resource pool ends, the D2DSS may be transmitted using the OLPC parameter of communication. In this case, T may be a value which is previously set, or may be a value signaled by the network through the physical layer or higher layer signal.

If the specific UE transmits both communication mode 1 and communication mode 2, or transmits both type 1 and type 2 even in case of discovery, D2DSS transmission near the D2D signal transmitted from the specific UE may determine a transmission power by using the OLPC parameter of the corresponding signal. If there are a plurality of D2D signal pools, the transmission power may be determined using the OPLC parameter of the pool that actually transmits the D2D signal.

Meanwhile, a rule may be determined to allow the UE to always follow a specific D2D signal indicated by the eNB or (OLPC) transmission power parameter allocated to a specific resource pool of the specific D2D signal if the specific UE transmits a plurality of D2D signals. For example, the UE which transmits mode 1 and type 1 discovery may always determine a transmission power of the D2DSS in accordance with OLPC parameter of mode 1 TPC. This is to give the first priority to transmission power configuration indicated by the eNB.

Meanwhile, it is suggested that a transmission power of the D2DSS is configured using a value obtained by applying a predetermined offset to the transmission power configured for the PSBCH or OLPC parameter. On the contrary, this method may be implemented in such a manner that a predetermined offset is applied when the network configures the PSBCH transmission power after configuring the transmission power of the D2DSS or OLPC parameter. This method is a method for reducing higher layer signaling overhead of the network for D2DSS and PSBCH transmission power configuration. However, a separate transmission power may be configured for flexibility of the transmission power of the D2DSS and the PSBCH, or a separate OLPC parameter may be configured.

Meanwhile, if the D2DSS is multiplexed with the PSBCH at a specific subframe, the D2DSS may be transmitted using the transmission power configured for the PSBCH or the OLPC parameter configured for the PSBCH. This is to reduce occurrence of ICI by minimizing or failing to arrange the transient period of power amplification as one UE configures a power within an SF without a big change.

Otherwise, if the D2DSS is multiplexed with another D2D or WAN channel (and/or signal) at a specific subframe, the D2DSS may be transmitted using a transmission power of the multiplexed D2D channel or WAN channel or OLPC parameter of the multiplexed channel. This method is to avoid a rapid change of the transmission power in a symbol unit when the D2DSS is multiplexed with another D2D channel. For example, if the D2DSS is transmitted at the same SF as that of SA, the D2DSS may be transmitted using a transmission power of SA or OLPC parameter of SA.

Otherwise, if the D2DSS is multiplexed with another D2D or WAN channel (and/or signal) at a specific subframe, the D2DSS may be transmitted using a transmission power or OLPC parameter configured for the D2DSS regardless of the multiplexed channel. This is to configure the transmission power regardless of the multiplexed channel within one SF and the transmission power of the D2DSS.

Meanwhile, if the D2DSS is multiplexed with another channel (D2D or WAN) and another WAN signal (for example, SRS) within a specific subframe, the WAN signal may configure a separate mask (previously defined for WAN signal), and the transmission power configuration of the D2DSS may follow one of the above methods.

Configuration of Apparatus According to the Embodiment of the Present Invention

Figure 19:
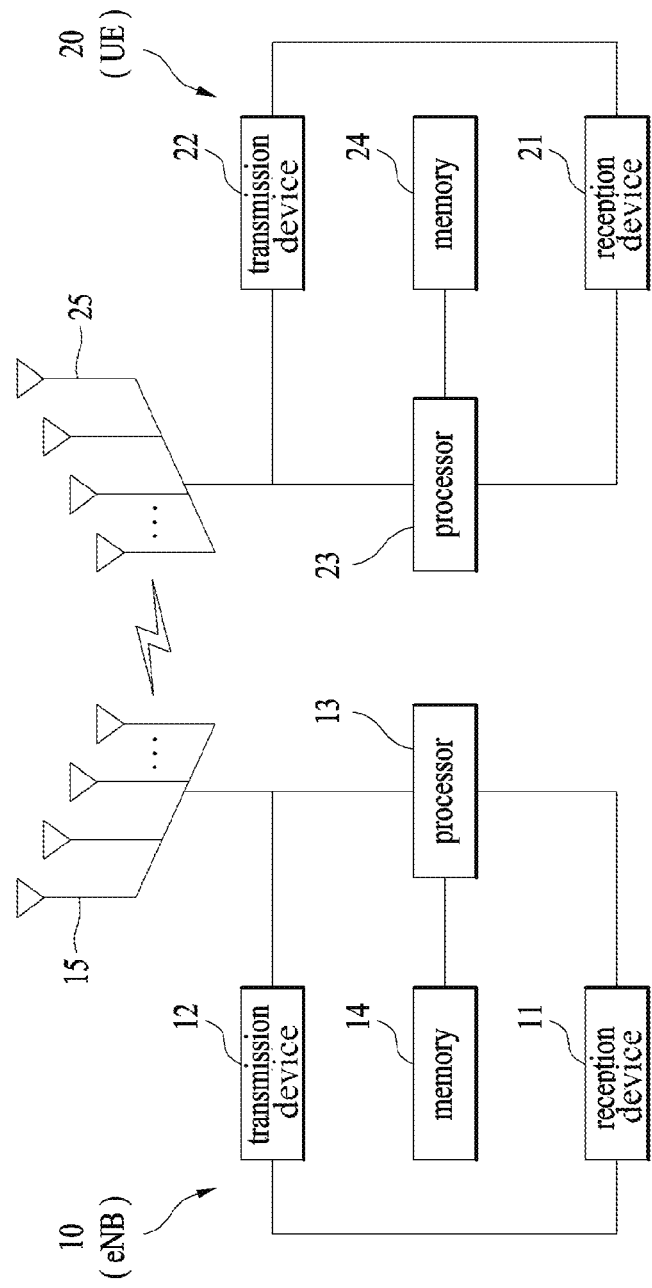
FIG. 19 is a diagram showing a configuration of a transceiving apparatus.

FIG. 19 is a diagram illustrating configurations of a transmission point and a user equipment (UE) according to the embodiment of the present invention.

Referring to FIG. 19, a transmission point apparatus 10 according to the present invention may include a reception module 11, a transmission module 12, a processor 13, a memory 14, and a plurality of antennas 15. The plurality of antennas 15 mean the transmission point that supports MIMO transmission and reception. The reception module 11 may receive various signals, data and information on an uplink from the UE. The transmission module 12 may transmit various signals, data and information on a downlink to the UE. The processor 113 may control an overall operation of the transmission point apparatus 10.

The processor 13 of the transmission point apparatus 10 according to one embodiment of the present invention may perform operations necessary for the embodiments described above.

The processor 13 of the transmission point apparatus 10 may function to computationally process information received by the transmission point apparatus 10 or information to be transmitted to the outside, etc. The memory 14, which may be replaced with an element such as a buffer (not shown), may store the computationally processed information for a predetermined time.

Subsequently, referring to FIG. 19, the UE 20 according to the present invention may include a reception module 21, a transmission module 22, a processor 23, a memory 24, and a plurality of antennas 25. The plurality of antennas 25 mean the UE that supports MIMO transmission and reception. The reception module 21 may receive various signals, data and information from an eNB on a downlink. The transmission module 22 may transmit various signals, data and information to the eNB on an uplink. The processor 23 may control an overall operation of the UE 20.

The processor 23 of the UE 20 according to one embodiment of the present invention may perform operations necessary for the embodiments described above.

The processor 23 of the UE 20 may function to computationally process information received by the UE 20 or information to be transmitted to the outside, and the memory 24, which may be replaced with an element such as a buffer (not shown), may store the computationally processed information for a predetermined time.

The detailed configurations of the transmission point apparatus and the UE as described above may be implemented such that the above-described embodiments are independently applied or two or more thereof are simultaneously applied, and description of redundant parts will be omitted for clarity.

Also, description of the transmission point apparatus 10 in FIG. 19 may also be applied to a relay which serves as a downlink transmission entity or an uplink reception entity, and description of the UE 20 may be equally applied to a relay which serves as a downlink reception entity or an uplink transmission entity.

The aforementioned embodiments of the present invention may be implemented through various means, for example, hardware, firmware, software, or a combination thereof.

When implemented by hardware, the method according to the embodiments of the present invention may be embodied by one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present invention may be embodied by a module, a procedure, or a function that performs the functions or operations described above. Software code may be stored in a memory unit and executed by a processor. The memory unit is located at the interior or exterior of the processor and may transmit and receive data to and from the processor via various known means.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

What is claimed is:
1. A sidelink user equipment (UE) in a wireless communication system, the sidelink UE comprising:
 a memory; and
 a processor coupled to the memory,
 wherein the processor is configured to transmit a primary sidelink synchronization signal (PSSS), a secondary sidelink synchronization signal (SSSS) and a physical sidelink broadcast channel (PSBCH) on a subframe,
 wherein the subframe comprises a PSBCH/PSSSS on power period and a SSSS on power period and a first transient period,
 wherein the first transient period is after the PSBCH/PSSSS on power period and before the SSSS on power period, and
 wherein the first transient period is overlapped with a resource on which the SSSS is transmitted.
2. The sidelink UE according to claim 1, wherein the first transient period is related to both a normal cyclic prefix (CP) and an extended CP.
3. The sidelink UE according to claim 1, wherein an overlapped period of the first transient period is included in a single symbol in the resource on which the SSSS is transmitted.
4. The sidelink UE according to claim 1, wherein the subframe further comprises a second transient period after the SSSS on power period, and
 wherein the second transient period overlaps with a guard period.
5. A method for transmitting from a sidelink UE in a wireless communication system, the method comprising:

transmitting a primary sidelink synchronization signal (PSSS), a secondary sidelink synchronization signal (SSSS) and a physical sidelink broadcast channel (PSBCH) on a subframe, wherein the subframe comprises a PSBCH/PSSSS on power period and a SSSS on power period and a first transient period, wherein the first transient period is after the PSBCH/PSSSS on power period and before the SSSS on power period, and wherein the first transient period is overlapped with a resource on which the SSSS is transmitted.

6. The method according to claim 5, wherein the first transient period is related to both a normal cyclic prefix (CP) and an extended CP.

7. The method according to claim 5, wherein an overlapped period of the first transient period is included in a single symbol in the resource on which the SSSS is transmitted.

8. The method according to claim 5, wherein the subframe further comprises a second transient period after the SSSS on power period, and wherein the second transient period overlaps with a guard period.

9. The method according to claim 8, wherein each of the first transient period and the second transient period is in units of microseconds.

10. The sidelink UE according to claim 4, wherein each of the first transient period and the second transient period is in units of microseconds.

11. The sidelink UE according to claim 4, wherein a length of the first transient period is twice a length of the second transient period.

12. The sidelink UE according to claim 4, wherein a length of the first transient period is 40 μs and a length of the second transient period is 20 μs.

13. The method according to claim 8, wherein a length of the first transient period is twice a length of the second transient period.

14. The method according to claim 8, wherein a length of the first transient period is 40 μs and a length of the second transient period is 20 μs.

* * * * *